United States Patent
Basler

(10) Patent No.: US 10,659,431 B2
(45) Date of Patent: *May 19, 2020

(54) IMPLEMENTING LOGICAL NETWORK SECURITY ON A HARDWARE SWITCH

(71) Applicant: Nicira, Inc., Palo Alto, CA (US)

(72) Inventor: Benjamin C. Basler, Los Altos, CA (US)

(73) Assignee: NICIRA, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/240,654

(22) Filed: Jan. 4, 2019

(65) Prior Publication Data

US 2019/0141011 A1  May 9, 2019

Related U.S. Application Data

(63) Continuation of application No. 15/253,562, filed on Aug. 31, 2016, now Pat. No. 10,182,035.

(Continued)

(51) Int. Cl.
*H04L 29/06* (2006.01)

(52) U.S. Cl.
CPC ...... *H04L 63/0236* (2013.01); *H04L 63/0263* (2013.01); *H04L 63/101* (2013.01); *H04L 63/20* (2013.01)

(58) Field of Classification Search
CPC ............. H04L 63/0236; H04L 63/0263; H04L 63/101; H04L 63/20

(Continued)

(56) References Cited

U.S. PATENT DOCUMENTS

| 5,526,484 A | 6/1996 | Casper et al. |
| 5,751,967 A | 5/1998 | Raab et al. |

(Continued)

FOREIGN PATENT DOCUMENTS

| EP | 1154601 A1 | 11/2001 |
| EP | 1653688 A1 | 5/2006 |

(Continued)

OTHER PUBLICATIONS

Non-Published Commonly Owned U.S. Appl. No. 16/403,493, filed May 3, 2019, 61 pages, Nicira, Inc.

(Continued)

*Primary Examiner* — Michael S McNally
(74) *Attorney, Agent, or Firm* — Adeli LLP

(57) ABSTRACT

Some embodiments provide a method for applying a security policy defined for a logical network to an MHFE that integrates physical workloads (e.g., physical machines connected to the MHFE) with the logical network. The method applies the security policy to the MHFE by generating a set of ACL rules based on the security policy's definition and configuring the MHFE to apply the ACL rules on the network traffic that is forwarded to and/or from the physical machines. In order to configure an MHFE to implement the different LFEs of a logical network, some embodiments propagate an open source database stored on the MHFE, using an open source protocol. Some embodiments propagate a particular table of the database such that each record of the table creates an association between a port of an LFE stored in a logical forwarding table and one or more ACL rules stored in an ACL table.

20 Claims, 12 Drawing Sheets

Related U.S. Application Data

(60) Provisional application No. 62/356,478, filed on Jun. 29, 2016.

(58) Field of Classification Search
USPC .................................................. 726/1
See application file for complete search history.

(56) References Cited

U.S. PATENT DOCUMENTS

| | | |
|---|---|---|
| 6,243,394 B1 | 6/2001 | Deng |
| 6,640,251 B1 | 10/2003 | Wiget et al. |
| 6,850,529 B1 | 2/2005 | Wong |
| 7,463,639 B1 | 12/2008 | Rekhter |
| 7,933,198 B1 | 4/2011 | Pan |
| 7,937,438 B1 | 5/2011 | Miller et al. |
| 8,046,456 B1 | 10/2011 | Miller et al. |
| 8,161,095 B2 | 4/2012 | Manion et al. |
| 8,345,688 B2 | 1/2013 | Zhou et al. |
| 8,386,642 B2 | 2/2013 | Elzur |
| 8,589,919 B2 | 11/2013 | Smith et al. |
| 8,874,876 B2 | 10/2014 | Bhadra et al. |
| 8,897,134 B2 | 11/2014 | Kern et al. |
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1 | 9/2015 | Swierk et al. |
| 9,154,433 B2 | 10/2015 | Koponen et al. |
| 9,178,833 B2 | 11/2015 | Koponen et al. |
| 9,306,843 B2 | 4/2016 | Koponen et al. |
| 9,319,375 B2 | 4/2016 | Gross et al. |
| 9,331,940 B2 | 5/2016 | Balus et al. |
| 9,369,426 B2 | 6/2016 | Koponen et al. |
| 9,397,946 B1 | 7/2016 | Yadav |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 | 9/2017 | Yadav et al. |
| 9,819,581 B2 | 11/2017 | Chanda et al. |
| 9,847,938 B2 | 12/2017 | Chanda et al. |
| 9,917,799 B2 | 3/2018 | Chanda |
| 9,923,815 B2 | 3/2018 | Assarpour et al. |
| 9,942,058 B2 | 4/2018 | Chanda et al. |
| 9,948,577 B2 | 4/2018 | Chanda |
| 9,967,182 B2 | 5/2018 | Chanda et al. |
| 9,979,593 B2 | 5/2018 | Chanda et al. |
| 9,992,112 B2 | 6/2018 | Chanda |
| 9,998,324 B2 | 6/2018 | Chanda et al. |
| 9,998,375 B2 | 6/2018 | Chanda |
| 10,153,965 B2 | 12/2018 | Davie et al. |
| 10,182,035 B2 | 1/2019 | Basler |
| 10,200,343 B2 | 2/2019 | Chanda et al. |
| 10,230,576 B2 | 3/2019 | Chanda et al. |
| 10,250,553 B2 | 4/2019 | Chanda et al. |
| 10,263,828 B2 | 4/2019 | Chanda et al. |
| 10,313,186 B2 | 6/2019 | Wang et al. |
| 10,411,912 B2 | 9/2019 | Chanda et al. |
| 10,447,618 B2 | 10/2019 | Chanda |
| 2002/0065919 A1 | 5/2002 | Taylor et al. |
| 2002/0093952 A1* | 7/2002 | Gonda ............... H04Q 3/68 370/369 |
| 2003/0041170 A1 | 2/2003 | Suzuki |
| 2003/0163645 A1 | 8/2003 | Tremblay et al. |
| 2004/0052216 A1 | 3/2004 | Roh |
| 2004/0267866 A1 | 12/2004 | Carollo et al. |
| 2005/0262132 A1* | 11/2005 | Morita ............ G06F 21/6218 |
| 2006/0092940 A1 | 5/2006 | Ansari et al. |
| 2007/0028039 A1* | 2/2007 | Gupta ............... G11C 15/00 711/108 |
| 2008/0189769 A1 | 8/2008 | Casado et al. |
| 2008/0215586 A1 | 9/2008 | Pruet |
| 2009/0006603 A1 | 1/2009 | Duponchel et al. |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1 | 3/2011 | Li et al. |
| 2011/0090911 A1 | 4/2011 | Hao et al. |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0147898 A1 | 6/2012 | Koponen et al. |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0058208 A1 | 3/2013 | Pfaff et al. |
| 2013/0058225 A1 | 3/2013 | Casado et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0060929 A1 | 3/2013 | Koponen et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0121209 A1 | 5/2013 | Padmanabhan et al. |
| 2013/0132533 A1 | 5/2013 | Padmanabhan et al. |
| 2013/0223454 A1 | 8/2013 | Dunbar et al. |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2013/0336134 A1 | 12/2013 | Bao et al. |
| 2014/0029451 A1 | 1/2014 | Nguyen |
| 2014/0029618 A1 | 1/2014 | Janardhanan |
| 2014/0071986 A1 | 3/2014 | Isobe |
| 2014/0101467 A1 | 4/2014 | Jubran et al. |
| 2014/0195666 A1 | 7/2014 | Dumitriu et al. |
| 2014/0201738 A1 | 7/2014 | Choi et al. |
| 2014/0229605 A1 | 8/2014 | Besser |
| 2014/0269683 A1 | 9/2014 | Bhagavathiperumal et al. |
| 2014/0269709 A1 | 9/2014 | Benny et al. |
| 2014/0301391 A1 | 10/2014 | Krishnan et al. |
| 2015/0009992 A1 | 1/2015 | Zhang |
| 2015/0100560 A1 | 4/2015 | Davie et al. |
| 2015/0100675 A1 | 4/2015 | Davie et al. |
| 2015/0100704 A1 | 4/2015 | Davie et al. |
| 2015/0103838 A1 | 4/2015 | Zhang et al. |
| 2015/0124586 A1 | 5/2015 | Pani |
| 2015/0124809 A1 | 5/2015 | Edsall et al. |
| 2015/0124821 A1 | 5/2015 | Chu et al. |
| 2015/0195178 A1 | 7/2015 | Bhattacharya et al. |
| 2015/0215189 A1 | 7/2015 | Lim |
| 2015/0281075 A1 | 10/2015 | Park et al. |
| 2015/0326425 A1 | 11/2015 | Natarajan et al. |
| 2015/0372906 A1 | 12/2015 | Tirat |
| 2015/0379150 A1 | 12/2015 | Duda |
| 2016/0014039 A1 | 1/2016 | Reddy et al. |
| 2016/0014073 A1 | 1/2016 | Reddy et al. |
| 2016/0173535 A1 | 6/2016 | Barabash et al. |
| 2016/0197824 A1 | 7/2016 | Lin et al. |
| 2016/0212222 A1 | 7/2016 | Bultema et al. |
| 2016/0232019 A1 | 8/2016 | Shah et al. |
| 2016/0308690 A1 | 10/2016 | Chanda et al. |
| 2016/0352633 A1 | 12/2016 | Kapadia et al. |
| 2016/0380812 A1 | 12/2016 | Chanda et al. |
| 2017/0034002 A1 | 2/2017 | Sinn |
| 2017/0034051 A1 | 2/2017 | Chanda et al. |
| 2017/0034052 A1 | 2/2017 | Chanda et al. |
| 2017/0034053 A1 | 2/2017 | Chanda et al. |
| 2017/0063608 A1 | 3/2017 | Wang et al. |
| 2017/0085502 A1 | 3/2017 | Biruduraju |
| 2017/0093617 A1 | 3/2017 | Chanda et al. |
| 2017/0093618 A1 | 3/2017 | Chanda et al. |
| 2017/0093636 A1 | 3/2017 | Chanda et al. |

(56) References Cited

U.S. PATENT DOCUMENTS

| | | |
|---|---|---|
| 2017/0093646 A1 | 3/2017 | Chanda et al. |
| 2017/0093686 A1 | 3/2017 | Uttaro et al. |
| 2017/0093758 A1 | 3/2017 | Chanda |
| 2017/0126615 A1 | 5/2017 | Chanda et al. |
| 2017/0171055 A1 | 6/2017 | Wang et al. |
| 2017/0171077 A1 | 6/2017 | Chanda |
| 2017/0171078 A1 | 6/2017 | Chanda |
| 2017/0171113 A1 | 6/2017 | Chanda |
| 2017/0208097 A1 | 7/2017 | Kirby et al. |
| 2017/0272316 A1 | 9/2017 | Johnson et al. |
| 2017/0317928 A1* | 11/2017 | Gude .................. H04L 45/72 |
| 2017/0366446 A1 | 12/2017 | Davie et al. |
| 2018/0007004 A1 | 1/2018 | Basler |
| 2018/0007005 A1 | 1/2018 | Chanda et al. |
| 2018/0026895 A1* | 1/2018 | Wang .................. H04L 41/142 370/235 |
| 2018/0183730 A1 | 6/2018 | Chanda |
| 2018/0219699 A1 | 8/2018 | Chanda et al. |
| 2018/0241622 A1 | 8/2018 | Chanda et al. |
| 2018/0241672 A1 | 8/2018 | Chanda et al. |
| 2018/0248796 A1 | 8/2018 | Chanda et al. |
| 2019/0089622 A1 | 3/2019 | Davie et al. |
| 2019/0207904 A1 | 7/2019 | Chanda et al. |
| 2019/0238393 A1 | 8/2019 | Chanda et al. |
| 2019/0260637 A1 | 8/2019 | Wang et al. |
| 2019/0356512 A1 | 11/2019 | Chanda et al. |

FOREIGN PATENT DOCUMENTS

| | | |
|---|---|---|
| JP | 2003069609 A | 3/2003 |
| WO | 2005112390 A1 | 11/2005 |
| WO | 2008095010 A1 | 8/2008 |

OTHER PUBLICATIONS

Non-Published Commonly Owned U.S. Appl. No. 16/531,104, filed Aug. 4, 2019, 38 pages, Nicira, Inc.

Al-Fares, Mohammad, et al., "A Scalable, Commodity Data Center Network Architecture," SIGCOMM '08, Aug. 17-22, 2008, 12 pages, Seattle, Washington, USA.

Graubner, Pablo, et al., "Cloud Computing: Energy-Efficient Virtual Machine Consolidation," IT Professional, Mar. 2013, 7 pages, vol. 15, Issue 2, IEEE.

Non-published commonly owned U.S. Appl. No. 16/179,982, filed Nov. 4, 2018, 83 pages, Nicira, Inc.

Pfaff, Ben, et al., "The Open vSwitch Database Management Protocol," draft-pfaff-ovsdb- proto-00, Aug. 20, 2012, 34 pages, Nicira, Inc., Palo Alto, California, USA.

Non-published commonly owned U.S. Appl. No. 16/577,937, filed Sep. 20, 2019, 53 pages, Nicira, Inc.

* cited by examiner

IMPLEMENTING LOGICAL NETWORK SECURITY ON A HARDWARE SWITCH

CLAIM OF BENEFIT TO PRIOR APPLICATIONS

This application is a continuation application of U.S. patent application Ser. No. 15/253,562, filed Aug. 31, 2016, now published as U.S. Patent Publication 2018/0007004. U.S. patent application Ser. No. 15/253,562 claims the benefit of U.S. Provisional Application 62/356,478, filed Jun. 29, 2016. U.S. patent application Ser. No. 15/253,562, now published as U.S. Patent Publication 2018/0007004.

BACKGROUND

There is a growing movement, driven by both industry and academia, towards a new network control paradigm called Software-Defined Networking (SDN). A logical (virtual) network that is implemented for a tenant of a hosting system is a good example for a software-defined network. Such a logical network connects a set of tenant's virtual machines that execute on one or more host machines, to each other and to other logical and/or physical networks. One of the challenges in today's SDN systems is adding physical workloads (e.g., one or more physical machines) to logical networks and applying the same logical network rules and policies to the physical workloads. For example, firewall rules can be applied to the virtual machines of a logical network in a distributed manner (e.g., through a security agent). Unlike software switches, a stateful firewall mechanism cannot be efficiently employed by a hardware switch. This is because, hardware switches are stateless and as such network data flows cannot be easily managed on them (i.e., keeping the state of every data flow requires a large amount of cache memory on the hardware switch which could be costly).

BRIEF SUMMARY

Some embodiments provide a method for applying a security policy defined for a logical network to a managed hardware forwarding element (MHFE) that integrates physical workloads (e.g., one or more physical machines connected to the MHFE) with the logical network. In some embodiments, the method applies the security policy to the MHFE by generating a set of access control list (ACL) rules based on the security policy's definition and configuring the MHFE (e.g., a top of rack switch, a physical router, etc.) to apply the ACL rules on the network traffic that is forwarded to and/or from the physical machines. The MHFE, along with a set of managed software forwarding elements (MSFEs) that executes on a set of host machines, implement a set of logical forwarding elements (LFEs) of the logical network. The set of LFEs logically connects the physical machines to a set of end machines that executes on the host machines. Each host machine executes an MSFE and may host a subset of the end machines (e.g., virtual machines, containers, etc.).

In some embodiments, a user (e.g., a network administrator, a tenant of a datacenter, etc.) defines a security policy for a logical network. The user defines the logical network (i.e., different elements of the logical network such as logical switches and routers) and the security policy for the logical network through a set of application programming interface (API) calls to a management plane of the network (e.g., a manager machine or application in a management cluster). The management plane, along with one or more controllers of a control plane of the network, configures the logical network (i) on a set of MSFEs that implement the logical network in a set of host machines and (ii) on a set of MHFEs through which a set of physical machines is coupled to the logical network.

The management and control planes configure a security agent on each host machine to implement the security policy in a distributed manner. That is, the management and controller planes convert the security policy defined by the user to a set of firewall rules, and configure a security agent on each host machine to apply the firewall rules on the network traffic that is destined for and/or originated from the logical network's end machines that run on the host machine. The security agent can be a security VM that runs on the host machine in some embodiments, while in other embodiments the security agent is a security instance that is instantiated in the virtualization software (e.g., hypervisor) of the host machine. The management and control planes also convert the security policy to a set of ACL rules and configure the MHFE to apply the ACL rules to the network traffic that is destined for and/or originated from the physical machines that are connected to the MHFE and that are coupled to the logical network.

The defined security policy, in some embodiments, may include several different security rules. A security rule, in some embodiments, is a high level rule for a network traffic from one or more source nodes to one or more destination nodes. The high level security rule of some embodiments includes a security group that defines the source nodes of the traffic, a security group that defines the destination nodes for the traffic, and a security group that defines the points at which, the security rule should be enforced. The security rule also includes an action that should be taken if the network traffic (e.g., a data packet) matches the rule (i.e., the identification data of the packet matches the identification data stored in the rule). The different actions, in some embodiments, include dropping the packet, denying the packet (e.g., dropping the packet and sending a message to the source node that the packet did not pass through), allowing the packet, or redirecting the packet to a different destination. Some other embodiments provide security rules that specify other actions to be taken once the source and destination of the packet matches the source and destination specified in the security rule.

Not every security rule, however, has to be a high level rule that includes security groups as the source and destination of the network traffic. For example, a security rule defined in the security policy of some embodiments may include a typical 5-tuple identification data (i.e., source, source port, destination, destination port, and service) along with a corresponding action (defined for a typical firewall rule). In such a case, it can be argued that each of the source, destination, and enforcement point of the security rule is still a security group with a single end machine as the source, a single end machine as destination, and a single point of enforcement (which is the entire network).

A security group, in some embodiments, includes a set of network elements (e.g., one or more virtual network interface controllers (VNICs), one or more virtual machines (VMs), one or more hosts, one or more forwarding elements (physical and logical), or any other compute construct and/or network construct that participates in a logical and/or physical network). In some embodiments, a security group can be specified as a dynamic group (e.g., a container that includes a group of virtual application, database, or web servers) that can have members (e.g., virtual machines, physical machines, etc.) dynamically added to and/or removed from the group.

A security rule, as stated above, also includes an AppliedTo tuple (field) in some embodiments. The AppliedTo tuple in some such embodiments is also a security group that lists one or more enforcement points at which, the security rule should be applied (i.e., enforced) on the network traffic. For example, the AppliedTo field may only include a single logical switch at which the corresponding rule should be applied to the network traffic. Conversely, the AppliedTo field may include a group of LFEs, a group of VMs, one or more MHFEs, one or more host machines, etc., or any combination of these network constructs at which, the corresponding rule should be applied. The AppliedTo field may also specify the entire logical network, or even a group of logical networks.

The management and control planes of some embodiments generate one or more 5-tuple firewall rules for each security rule defined in the security policy to be enforced at the lower levels of the logical network. That is, based on the AppliedTo field of a security rule, the security firewall rules generated from the security rule are configured on a set of forwarding elements of the logical network (e.g., on logical ports of LFEs, on VNICs of VMs, etc.). For implementing the security policy on an MHFE, however, the management and control planes generate several different ACL rules (based on the defined security rules) and configure the MHFE to enforce the ACL rules on the network traffic passing through the MHFE (e.g., through a physical port of the MHFE, to which a logical port that the security rule specifies, is mapped). In some embodiments, a single firewall rule that is generated from a security rule defined in the security policy, could be associated with more than one ACL rules.

As stated above, some embodiments generate ACL rules based on the security policy that a user provides for a logical network. The generated ACL rules are applied to an MHFE (e.g., to the network traffic that is forwarded to and from a physical machine connected to the MHFE), when the AppliedTo field of a corresponding security rule dictates so. For example, when the AppliedTo field of a security rule includes a logical switch to which a physical server is coupled, the corresponding ACL rules will be enforced on the MHFE that implements the logical switch (i.e., each ACL rule will be enforced on a physical port of the MHFE which maps the logical port of the logical switch with which the physical machine is coupled). The AppliedTo field of a security rule might as well contain any other network element that can be defined in a security group (e.g., an MHFE, a logical router, etc.). In other words, in order to apply the ACL rules to one or more physical machines that are connected to an MHFE, the AppliedTo filed is not necessarily a logical switch that is mapped to the MHFE and can be any other security group in some embodiments.

In some embodiments, a user defines a security group that contains a physical machine (e.g., a physical server) coupled to a logical network. In some embodiments, the user can specify the different network layer's addresses of the physical machine (e.g., internet protocol (IP) and media access control (MAC) addresses of the machine) in the defined security group. Some other embodiments acquire these different network layers' addresses automatically using different methods and techniques (e.g., trust on first use (TOFU), FQDN mapping, HTTP snooping, etc.) when a physical machine is specified in a security group, and add the acquired addresses to the physical machine's corresponding records of the security group.

In some embodiments, when a logical switch is mapped to a hardware switch, each time a new physical device is connected to the hardware switch, the network layers two and three addresses of the physical device is automatically reported to the control plane, which in turn adds these addresses to a corresponding security group of the device. The control plane of some such embodiments uses an open database protocol and a database schema stored on the hardware switch to receive the new addresses of a recently connected device. When a virtual local area network (VLAN), that covers several different physical servers, is mapped to a hardware switch (e.g., a physical port of the switch), some embodiments add the IP and MAC addresses of each physical server to the corresponding security group (e.g., statically by a user, automatically using an open source database and protocol, or using one of the known techniques such as TOFU).

In order to configure an MHFE to implement the different logical forwarding elements (e.g., logical switches, logical routers, etc.) of a logical network, some embodiments propagate an open source database such as a hardware VXLAN tunnel endpoint (VTEP) database schema (some embodiments refer to an MHFE as a hardware VTEP since it implements a tunnel endpoint to communicate with other software and/or hardware managed forwarding elements) stored on the MHFE. Some such embodiments propagate the database using an open source protocol (e.g., an open vSwitch database management (OVSDB) protocol) that is recognizable and used by the MHFE. The management and control plane of some embodiments also populate one or more ACL tables, stored on the MHFE, with the generated ACL rules.

In order to tie an ACL table to the database containing the forwarding data (i.e., in order to apply the ACL rules on the set of LFEs, forwarding behavior of which is defined in the database), some embodiments configure a particular table in the database that links the ACL table to one or more other database tables. That is, some embodiments propagate a particular table of the database such that each record of the table creates an association between a port (or interface) of an LFE stored in a logical forwarding table and one or more ACL rules stored in the ACL table. This way, when a packet is received at the port, the packet is inspected and acted upon based on the ACL rules associated with the port.

In some embodiments, the ACL rules in the populated ACL table are ranked based on their priority of enforcement. That is, the ACL rules are sorted in the ACL table based on their priority and each ACL rule has a corresponding priority rank in the ACL table. As such, when a particular packet matches more than one ACL rule in the table (i.e., the source and destination headers in the packet match the same source and destination addresses stored in two or more records of the ACL table), the highest ranked rule will be applied to the packet (i.e., the action that is defined in the highest ranked rule record will be applied to the packet).

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
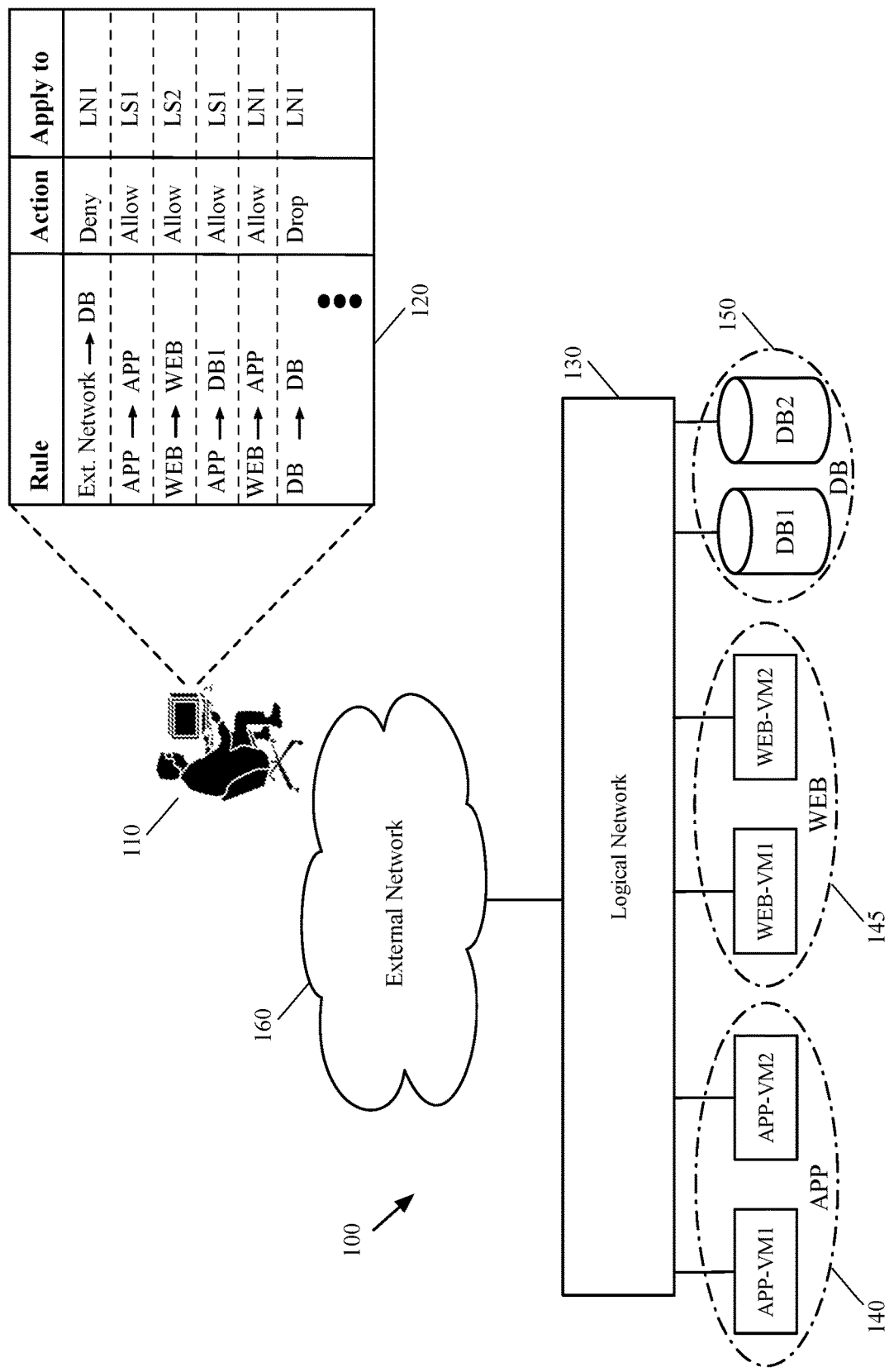
FIG. 1 illustrates a logical network architecture that logically connects different end machines (e.g., virtual and physical machines) to each other (and to other networks), and a security policy defined by a user that should be applied to the logical network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for applying a security policy defined for a logical network to a managed hardware forwarding element (MHFE) that integrates physical workloads (e.g., one or more physical machines connected to the MHFE) with the logical network. In some embodiments, the method applies the security policy to the MHFE by generating a set of access control list (ACL) rules based on the security policy's definition and configuring the MHFE (e.g., a top of rack switch, a physical router, etc.) to apply the ACL rules on the network traffic that is forwarded to and/or from the physical machines. The MHFE, along with a set of managed software forwarding elements (MSFEs) that executes on a set of host machines, implement a set of logical forwarding elements (LFEs) of the logical network. The set of LFEs logically connects the physical machines to a set of end machines that executes on the host machines. Each host machine executes an MSFE and hosts a subset of the end machines (e.g., virtual machines, containers, etc.).

In some embodiments, a user (e.g., a network administrator, a tenant of a datacenter, etc.) defines a security policy that has to be applied to a logical network. The user defines the logical network (i.e., different elements of the logical network such as logical switches and routers) and the security policy for the logical network through a set of application programming interface (API) calls to a management plane (e.g., a manager machine or application in a management cluster).

The defined security policy, in some embodiments, may include different types of security rules. For example, a security rule defined in the security policy of some embodiments may include a typical 5-tuple identification data (i.e., source, source port, destination, destination port, and service) along with a corresponding action, which is a typical firewall rule. Some embodiments also include security rules, in which each of the source and destination, instead of having a layer two and/or layer three address, includes a security group. That is, some embodiments provide security rules in which the source and/or destination node of the network traffic is a security group instead of an IP and/or MAC address of a source and/or destination end machine.

A security group, in some embodiments, includes a set of network elements (e.g., one or more virtual network interface controllers (VNICs), one or more virtual machines (VMs), one or more hosts, one or more forwarding elements (physical and logical), or any other compute construct and/or network construct that participates in a logical and/or physical network). In some embodiments, a security group can be specified as a dynamic group (e.g., a container that includes a group of Application or Web server VMs) that can have members (e.g., new VMs, etc.) dynamically added to and/or removed from the group.

In some embodiments, a user defines a security group that contains the physical machine (e.g., a physical server) that is coupled to the logical network. In some such embodiments, the user can specify the different network layer's addresses of the physical machine (e.g., IP and MAC addresses of the machine) in the security group. Some other embodiments acquire the different network layers' addresses automatically using different methods (e.g., trust on first use (TOFU), FQDN mapping, HTTP snooping, etc.) and add these addresses to the physical machine's corresponding security group.

In some embodiments, when a logical switch is mapped to a hardware switch, each time a new physical device is connected to the hardware switch, the network layers 2 and 3 addresses of the physical device is automatically reported to the control plane, which in turn adds these addresses to a corresponding security group for the device. The control plane of some such embodiments uses an open database protocol and a database schema stored on the hardware switch to receive the new addresses of a recently connected device. When VLAN that covers several different physical servers is mapped to a hardware switch (e.g., a physical port of the switch), some embodiments add the IP and MAC addresses of each physical server to the corresponding security group (e.g., statically, using an open source database and protocol, using one of the known methods such as TOFU).

A security rule, as stated above, also includes an AppliedTo tuple (field) in some embodiments. The AppliedTo tuple in some such embodiments is also a security group that lists one or more enforcement points at which, the security rule should be applied (i.e., enforced) on the network traffic. For example, the AppliedTo field may only include a single logical switch at which the corresponding rule should be applied to the network traffic. Conversely, the AppliedTo field may include a group of LFEs, a group of VMs, one or more MHFEs, one or more host machines, etc., at which, the corresponding rule should be applied.

FIG. 1 illustrates a logical network architecture 100 that logically connects different end machines (e.g., virtual and physical machines) to each other (and to other networks), and a security policy defined by a user that should be applied to the logical network. The figure shows a user 110 defining a security policy 120 for a logical network 130. The logical network 130 logically connects the end machines of different tiers of a multi-tier network architecture to each other. As shown, each tear is assigned a dynamic security group.

More specifically, APP security group 140 is defined for the application tier machines (e.g., servers), WEB security group 145 is defined for the web tier machines, and DB security group 150 is defined for the database tier machines. The logical network 130 also connects these different machines to external network 160, through which the end machines also connect to other machines of other networks. The external network 160 could be a physical network such as the Internet, another logical network that is implemented by the same physical network infrastructure on which the logical network 130 is implemented, or any other physical and/or logical network.

The logical network 130, in some embodiments, as will be illustrated below by reference to FIG. 2, includes several different logical forwarding elements and other logical network elements (e.g., logical firewall, logical load balancer, etc.) that are placed on different logical paths of the network. The logical forwarding elements of a logical network logically connect several different data compute nodes (e.g., virtual machines (VMs), containers, namespaces, etc.) that run on different host machines, to each other and to other physical machines that are integrated with the logical network through MHFEs (e.g., top of rack (TOR) switches, hardware routers, etc.).

The logical forwarding elements that logically connect the data compute nodes (DCNs), in some embodiments, define a logical network topology for a user (e.g., a tenant) of a hosting system (e.g., a datacenter). In some embodiments, different subsets of DCNs of a logical network reside on different host machines and are connected together through one or more logical forwarding elements. For example, a first DCN of the logical network executes on a first host machine and is coupled to a first logical port of a logical switch, while a second DCN of the logical network executes on a second host machine and is coupled to a second logical port of the logical switch.

The user 110 defines the logical network topology (i.e., the connection between the different logical network elements) and the security policy 120 for the logical network through the management plane of the logical network. The management plane of a logical network, in some embodiments, includes one or more manager machines (or manager applications) through which the different logical network elements are defined (through API calls). The management plane pushes the network elements' data to the control plane of the logical network (e.g., one or more controller computers (or applications) that control the data exchange in the logical network). The management and control planes configure the logical network elements on a set of physical nodes (e.g., host machines, gateway machines, etc.) that implement the logical network.

The security policy 120, as shown in the figure, includes one or more high level security rules (in the Rule field), a corresponding action for each security rule (in the Action field), and one or more logical network constructs on which the rule should be applied (the AppliedTo field). For example, the first record of the policy table 120 indicates that network access from external network 160 to all machines (physical or virtual) in the database tier 150 should be denied. This record additionally shows that the enforcement point for applying this rule is the entire logical network. In other words, any network access to any of the machines in the database tier through any logical forwarding element that couples the DB machines to the logical network has to be denied. This way, the user does not need to know whether database servers DB1 and DB2 are logically coupled to the same logical switch in the logical network topology, or each database server is coupled to a different logical switch. Neither does the user need to know about the number of database servers in the database security group 150 and whether in the future any new server will be added to or removed from this security group.

Each time a new virtual server machine is added to a security group or a current server VM is removed or migrated from a security group (e.g., APP-VM1 is removed from the security group 140, or a new WEB-VM is added to the security group 145), the management and control planes of some embodiments receive and/or discover the network layer addresses of the virtual machine. The management and control plane then update the corresponding addresses in the security group. On the other hand, each time a new physical server is added to, or a current physical server is removed from a security group (e.g., physical server DB2 is removed from the security group 150, or a new database server is added to this security group), the network layer addresses of the physical server is updated in the corresponding security group.

In some embodiments, the L2 and L3 addresses of a physical machine are updated (in a security group) manually (e.g., by the user). In some other embodiments the L2 and L3 addresses of the physical machine is received through one of the known methods such as trust on first use (TOFU) method. Yet, in some other embodiments, these addresses are received through an open source protocol that is used to communicate with a corresponding MHFE to which the physical server is recently connected, or from which the server is disconnected. The management and control plane then update the corresponding security tables on the physical nodes (e.g., firewall tables used by a security agent on a host machine, ACL table used by the MHFE, etc.).

As another example, the fourth record of the policy table 120 indicates that any network traffic from application servers in the APP tier 140 to the database server DB1 in the DB tier 150 should be allowed. This record additionally shows that the enforcement point for applying this rule is only logical switch LS1 in the logical network. In other words, the network traffic from any application tier's machine to the database server DB1 should be allowed as long as the traffic passes through one of the logical ports of the logical switch LS1. As will be discussed in more detail below, this fourth record of the policy 120 results in creation of a set of ACL rules in an ACL table stored on physical server DB1, since this server is logically coupled to a logical port of the logical switch LS1 (which is implemented on a hardware switch to which the server DB1 is physically coupled).

The above introduced the general concepts and implementation of applying network policy to a logical network in some embodiments. In the following, Section I describes configuring a managed hardware forwarding element (e.g., a TOR switch) to apply network policy to network traffic directed to the MHFE using layer two and layer three ACL rules. Section III then describes the electronic system with which some embodiments of the invention are implemented.

I. Configuring a Hardware Switch to Implement ACLs

As stated above a logical network of some embodiments includes one or more logical network elements such as logical forwarding elements and logical middleboxes (e.g., logical firewall, logical network address translator (NAT), logical load balancer, etc.) that are placed on different logical paths of the network. The logical network elements of a logical network are defined by a user (e.g., a tenant of a hosting system) through a set of API calls, and are configured (through the network management and control plane) on different physical nodes (e.g., host machines, gateway machines, etc.) of a physical network infrastructure that implements the logical network.

As such, the logical network elements, in some embodiments, can be viewed from three different perspectives. The first of these views is the API view, or definition view, which is how the user views and defines the logical network elements. The second view is the configuration view, which is how the management and controller planes internally define and configure the logical network elements defined by the user. Finally, the third view is the physical realization, or implementation view of the logical network elements, which is how the logical elements are actually implemented by the physical network.

Although the configuration data for each logical network element is different than the definition data for the same element, it is important to know that the second view of some logical network elements are not necessarily different from the first view of the element in some embodiments. For example, since the management and control planes generate different logical network elements for a single logical router to configure the logical router defined by a user, the configuration view for the logical router is different than the API view of the router. However, a logical switch is shown in a similar way in both API and configuration views.

Figure 2:
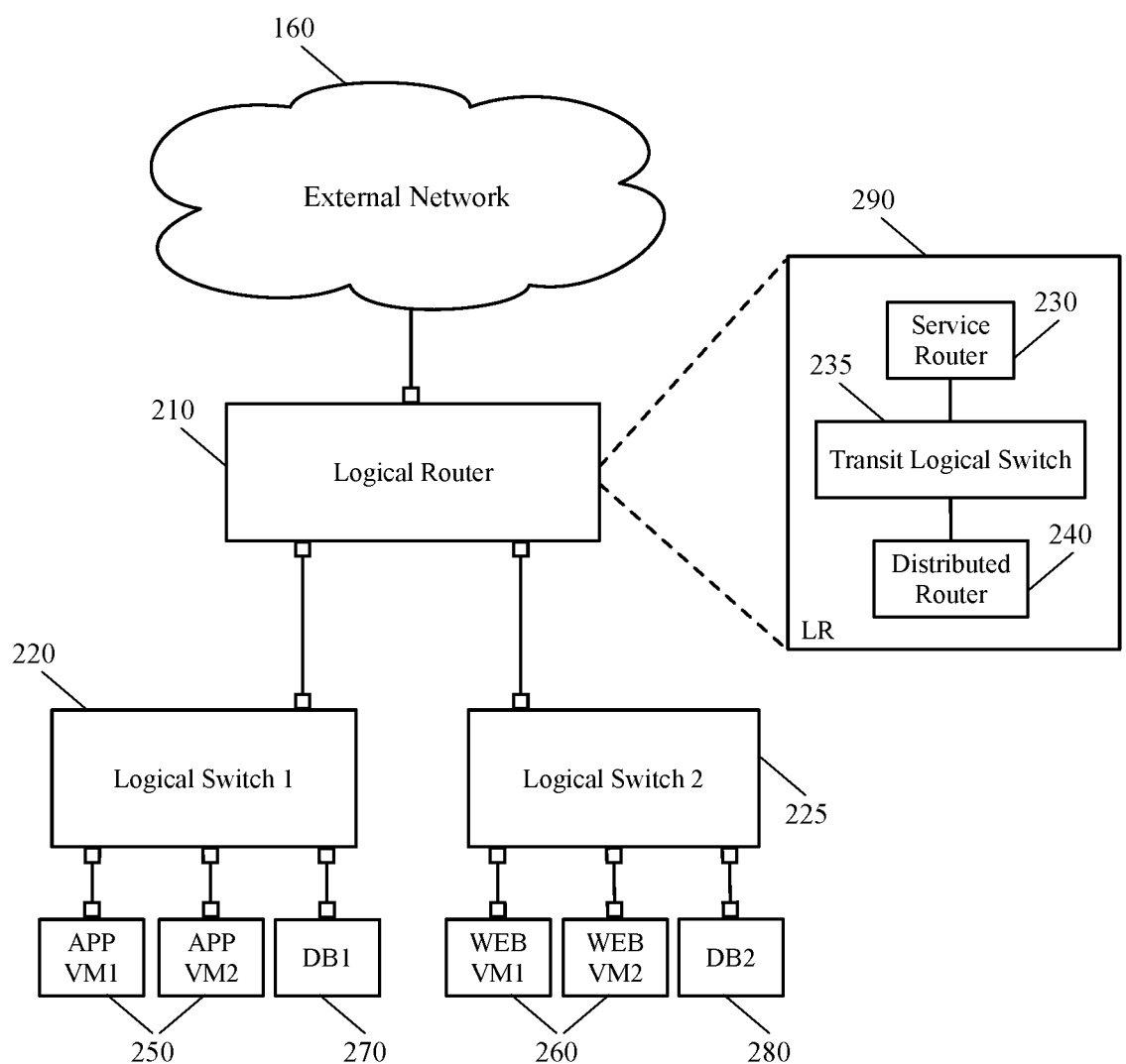
FIG. 2 illustrates the API view of a logical network as defined by a user (e.g., a datacenter provider, a tenant of a hosting system, etc.).

FIG. 2 illustrates the API view 200 of a logical network as defined by a user (e.g., a datacenter provider, a tenant of a datacenter, etc.). As shown, the logical network includes a logical router 210 that is connected (through two logical interfaces) to two logical switches 220 and 225. The logical router 210 also has a northbound logical port that is coupled to the external network 160. Logical switch 220 has logical ports that are connected to application virtual machines 250 (i.e., APP-VM1 and APP-VM2), as well as the physical database server 270. On the other hand, the logical switch 225 has logical ports connected to web virtual machines 260 (i.e., WEB-VM1 and WEB-VM2), as well as the physical database server 280. Therefore, the virtual web servers 260 and virtual application servers 250 are connected (logically) to each other, to the physical database servers 270-280, and to the external network 160 through the logical router 210 and logical switches 220-225.

While the different application and web servers are shown as VMs in this figure and other figures below, it should be understood that other types of data compute nodes (e.g., namespaces, containers, etc.) may connect to logical forwarding elements in some embodiments. It should also be understood that although in the illustrated example (and other examples) the web and application machines are shown as virtual machines and the database machines are shown as physical machines, any combination of these machines is possible in some embodiments. For example, each, or both of the application servers 250 can be physical servers, while each, or both of the database servers 270-280 can be virtual machines (or servers). Additionally, one of ordinary skill in the art will realize that although shown as servers, a physical machine in this and other examples can be any type of machine such as a desktop computer, a laptop, a printer, etc.

FIG. 2 also illustrates the configuration view 290 of the logical router 210. The configuration view 290 for the distributed implementation of the logical router illustrates that the management and control planes, after receiving the definition of the distributed logical router, creates a distributed routing component (e.g., distributed router 240), one or more service routing components (e.g., service router 230), and a transit logical switch 235 based on the received logical router data. In some embodiments, the management and control planes generate separate routing information bases (RIBs) and/or forwarding information bases (FIBs) for each of the routing components 230 and 240. That is, in addition to having separate objects created in the management/control plane, each of the routing components is treated as a separate router with separate routes.

The transit logical switch 235 has different logical ports for each of the created routers 230 and 240, and each of the routing components 230 and 240 has an interface to logically connect to the transit logical switch 235. Such implementation of the distributed logical router 210 enables first-hop routing in a distributed fashion (rather than concentrating all of the routing functionality at the gateways). In the physical realization, as will be described below by reference to FIG. 3, the distributed router (DR) 240 spans all of the MSFEs and MHFEs that couple directly with data compute nodes (e.g., virtual machines running in the host machines, physical machines connected to the MHFEs, etc.) that are logically connected, directly or indirectly, to the logical router. The DR 240 of some embodiments also spans the gateway machines on which the service routers are implemented. The DR 240 of some embodiments is responsible for first-hop distributed routing between logical switches and/or other logical routers that are logically connected to the logical router 210.

The service routers (SRs), such as the SR 230, are responsible for delivering services that are not implemented in a distributed fashion (e.g., some stateful services) in some embodiments, as well as connecting the logical network to external networks, such as the external network 160. A distributed logical router will have SRs if either (i) the logical router is a provider logical router (PLR) in a multi-tier logical network structure, and therefore connects to external physical networks (e.g., outside a datacenter) or (ii) the logical router has services configured that do not have a distributed implementation (e.g., NAT, load balancing, DHCP in some embodiments). Even if there are no stateful services configured on a PLR, some embodiments use SRs for failure handling and for equal cost multi path (ECMP) forwarding.

The detailed functionality of a logical router, as well as, different types of logical routers such as provider logical routers (administrated by, e.g., the owner of a datacenter) and tenant logical routers (administrated by, e.g., different tenants of a datacenter), and the different routing components of a logical router (e.g., DR, SRs, etc.) are described in greater detail in the U.S. patent application Ser. No. 14/814,473, filed Jul. 30, 2015, now issued as U.S. Pat. No. 9,787,605.

Figure 3:
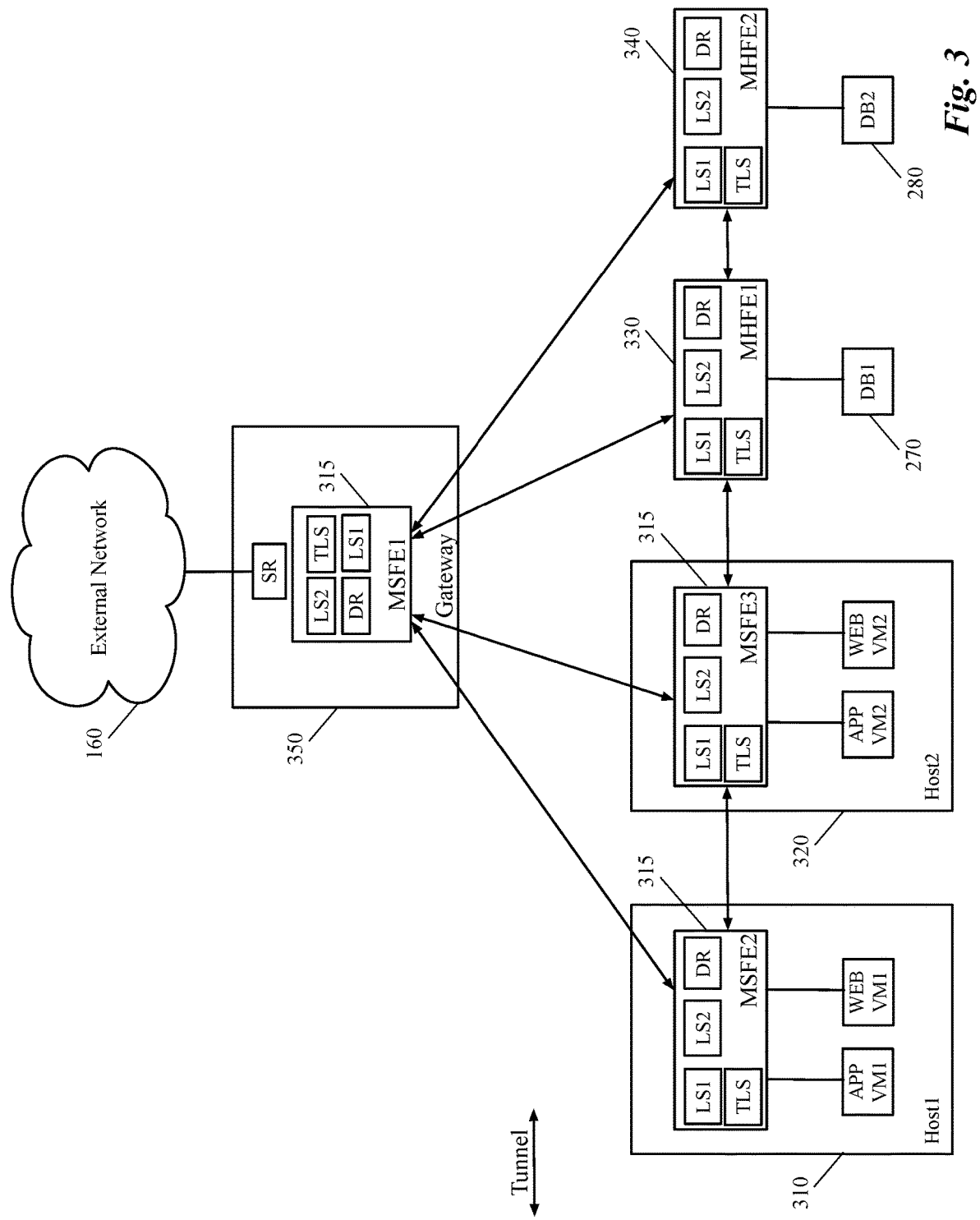
FIG. 3 illustrates the physical distributed implementation of the logical network topology, shown in FIG. 2.

FIG. 3 illustrates the physical distributed implementation of the logical network topology 200, shown in FIG. 2 above. More specifically, this figure shows that the data compute nodes that are coupled to the same LFE, are not necessarily connected to the same MSFE and/or MHFE (i.e., the DCNs execute on different host machines and/or coupled to different hardware switches). As shown, the virtual machine APP-VM1, which couples to the logical switch 220 in the logical network 200, operates on the host machine 310 (Host1), while APP-VM2 that couples to the same logical switch 220, operates on a different host machine 320. Additionally, the two physical database servers that are coupled to the logical switches 220 and 225 are connected to different MHFEs in the physical implementation of the logical network. That is, the database server 270 (DB1) is connected to a physical port of the MHFE 330, while the database server 280 (DB2) is connected to a physical port of MHFE 340.

One of ordinary skill in the art would realize that the number of illustrated VMs and database servers are exemplary and only to simplify the description. Otherwise, a logical network for a tenant of a hosting system may span a multitude of host machines and third-party devices, and logically connect a large number of end machines to each other and to several other physical devices. Also, it should be understood that that database servers DB1 and DB2 are not the only physical machines that are connected to MHFEs 330-340. A real MHFE such as a top of rack (TOR) switch may connect several different servers (in a rack), or any other physical computing devices (e.g., desktops, printers, etc.) to one or more logical networks through the different physical ports of the MHFE.

Each of the host machines 310 and 320 executes a managed software forwarding element 315 (i.e., MSFE2 and MSFE3, respectively). In some embodiments, each of the MSFEs that operates on a host machine is a software switch that is instantiated in the virtualization software (e.g., a hypervisor) of the host machine. Each of the MHFEs 330 and 340, in some embodiments, is a third-party hardware switch that implements one or more logical networks and logically connects the physical workload attached to the MHFE to the end machines and other devices in the logical network.

In the illustrated example, a first logical port of the logical switch 220 is mapped to a physical (software) port of MSFE2 that is coupled to APP-VM1 executing on the first host machine 310. A second logical port of the logical switch 220 is mapped to a physical (software) port of MSFE3 that is coupled to APP-VM2 executing on the second host machine 320. A Third logical port of the logical switch 220 is mapped to a physical (hardware) port of MHFE1 that is coupled to the physical database server DB1. Similarly, a first logical port of the logical switch 225 is mapped to a physical (software) port of MSFE2 that is coupled to WEB-VM1 executing on the first host machine 310. A second logical port of the logical switch 225 is mapped to a physical (software) port of MSFE3 that is coupled to WEB-VM2 executing on the second host machine 320. A Third logical port of the logical switch 225 is mapped to a physical (hardware) port of MHFE2 that is coupled to the physical database server DB2.

As such, when a user creates a security policy with a security rule that should be applied to a logical forwarding element, the management and control planes configure several different security agents running on different host machines (e.g., security agents SE1 and SE2 shown in FIG. 5 below) to implement the firewall rules that are generated based on the security rule. For example, when the AppliedTo field of the security rule specifies that the security rule should be applied to logical switch 220, the management and control plane identifies the MSFEs and MHFEs that implement the different logical ports of the logical switch and configure the security agents SE1 and SE2 running on the host machines Host1 and Host2 to apply the corresponding firewall rules generated from the security rule on the network traffic that passes through these logical ports. For example, the security agents apply the rule on the VNICs of the VMs or on the physical (software) ports of the MSFEs. At the same time ACL rules that are generated from the security rule will be applied to each physical port of an MHFE that is mapped to the logical port of logical switch.

The MSFEs and MHFEs implement the logical switches 220 and 225, as well as the DR 240 and transit logical switch 235 of the logical router in order to perform forwarding processing pipelines of these LFEs. In other words, the LFEs are implemented across the MSFEs, the MHFEs, and the gateway machine 350. That is, the datapaths (e.g., in the MSFEs 315, or in a different form factor on the gateways and MHFEs) all include the necessary processing pipelines for the distributed forwarding elements. Unlike the distributed forwarding elements, the service router 2 operates on a single gateway machine 350. The MSFEs of some embodiments perform first-hop switching for the logical switches 220 and 225 for packets sent by virtual application and web servers (unless the pipeline of the transit logical switch 235 specifies to send the packet to a SR). The MSFEs 315 and MHFEs 330 and 340 (or a subset of them) may also implement logical switches (and distributed logical routers) for other logical networks if the other logical networks have VMs that reside on the host machines Host1 and Host2 as well.

Although in the illustrated embodiment, each host machine executes only one MSFE, some embodiments provide a set of MSFE that implements the different LFEs of the logical network on a host machine. The set of MSFEs together performs the forwarding processing of the LFEs for the packets that are received from or sent to the corresponding end machines that are connected to the MSFEs. For example, based on the number of logical forwarding elements and other factors, the number of MSFEs in a set of MSFEs that implement the logical elements may vary. In some embodiments, each MSFE in the set may implement a certain number of logical forwarding elements, a certain type of logical forwarding elements, or a combination of both. As such, in the above and below examples, although only one MWFE is used to describe the functionality of the set of MFEs, it should be understood that more than one MSFE in a set of MSFEs may perform the described functionality.

The MSFEs 1-3 and MHFEs 1-2 are also connected to each other through the illustrated tunnels in order to exchange network data after performing the forwarding functionalities of the logical forwarding elements. That is, in order to exchange the network data between the different elements of the logical network, the different MSFEs and MHFEs that implement the logical forwarding elements establish tunnels between themselves (i.e., tunnel data packets between each other using a particular tunneling protocol such as VXLAN protocol). In some embodiments, the control plane distributes configuration data to the MSFEs and MHFEs (e.g., through separate local controllers of MSFEs and MHFEs), which includes instructions on how to set up tunnels between the MSFEs and MHFEs. For instance, the configuration data specifies the location (e.g., IP address) of each tunnel endpoint implemented by the MSFE and/or MHFE.

In some embodiments, when the MSFE (or MHFE) receives a packet from a VM that is coupled to the managed forwarding element, it performs the processing for the logical switch to which that end machine logically couples, as well as the processing for any additional logical forwarding elements (e.g., logical router processing if the packet is sent to an external network, logical router processing and processing for the other logical switch in the network if the packet is sent to an end machine coupled to the other logical switch, etc.). The managed forwarding element then based on this forwarding processing identifies that managed forwarding element that implements the other logical port of the logical forwarding element. After such identification, the managed forwarding element uses the address (e.g., IP address) of the other managed forwarding element as the destination tunnel endpoint and tunnels the packet to the destination managed forwarding element (which in turn decapsulates the packet and forwards it towards the packet's final destination.

In some embodiments, the gateway machine 350 (also called an edge node in some embodiments) is a host machine similar to the host machines Host1 and Host2. The gateway machine, as described above, executes the service router 230 (rather than user or server VMs). As shown in the figure, gateway machine 350 also includes an MSFE 315, which is similar to the other MSFEs 1-2 operating on the other host machines that implement the logical forwarding elements of the logical network. Although shown as one gateway machine that executes the one SR of the logical router, some embodiments generate multiple SRs for a logical router, each of which, is implemented by a different gateway machine. Additionally, in an active-standby implementation (e.g., in a failover scenario), a first gateway machine executes an active SR of the logical router, while a second gateway machine executes a stand-by SR which becomes active when the active SR cease to function for any reason.

Different embodiments implement the SRs differently. Some embodiments implement the SRs as VMs (e.g., when the MSFE is a software switch integrated into the virtualization software of the gateway machine), in which case the SR processing is performed outside of the MSFE. On the other hand, some embodiments implement the SRs as virtual routing and forwarding (VRFs) elements within the MSFE datapath (when the MSFE uses DPDK for the datapath processing). In either case, the MSFE treats the SR as part of the datapath, but in the case of the SR being a VM (or other data compute node) separate from the MSFE, the MSFE sends the packet to the SR for processing by the SR pipeline (which may include the performance of various services). As with the MSFEs on the host machines Host1 and Host2, the MSFE of the gateway machine, as described above, is configured to perform all of the distributed processing components of the logical network.

As described above, the management plane, along with one or more controllers in a central control plane, configures the logical network (i) on a set of MSFEs that implement the logical network in a set of host machines and (ii) on a set of MHFEs through which a set of physical machines is coupled to the logical network. The management and control planes also configure a security agent on each host machine to implement the security policy in a distributed manner. That is, the management and controller planes convert the security policy to a set of firewall rules and configure a security agent on each host machine to apply the firewall rules on the network traffic that is destined for and/or originated from the end machines that run on the host machine and are coupled to the logical network. The security agent can be a security VM that runs on the host machine in some embodiments, while in some other embodiments the security agent is a security instance that is instantiated in the virtualization software of the host machine.

The management and control planes also convert the security policy to a set of ACL rules and configure the MHFE to apply the ACL rules to the network traffic that is destined for and/or originated from the physical machines that are connected to the MHFE and are coupled to the logical network. When the AppliedTo field of a security rule identifies a logical switch to which a physical machine is coupled, some embodiments generate ACL rules based on the source and destination of the security rule. For example, when the AppliedTo field of a security rule includes a logical switch to which a physical server is coupled, the corresponding ACL rules will be enforced on the MHFE that implements the logical switch (i.e., each ACL rule will be enforced on a physical port of the MHFE which maps the logical port of the logical switch with which the physical machine is coupled). The AppliedTo field of a security rule may also contain any other network element that can be defined in a security group (e.g., an MHFE, an entire logical network, etc.). In other words, in order to apply the ACL rules to one or more physical machines that are connected to an MHFE, the AppliedTo filed is not necessarily a logical switch that is mapped to the MHFE and can be any other security group in some embodiments.

Based on the AppliedTo field of a security rule, the security firewall rules are configured on a set of forwarding elements of the logical network (e.g., on logical ports of LFEs, on VNICs of VMs, etc.). For implementing the security policy on an MHFE, however, the management and control planes generate several different ACL rules (based on the defined security rules) and configure the MHFE to enforce the ACL rules on the network traffic passing through the MHFE (e.g., through a physical port of the MHFE, to which a logical port that the security rule covers, is mapped). In some embodiments, a single firewall rule that is generated from a security rule defined in the security policy, could be associated with more than one ACL rules.

Figure 4:
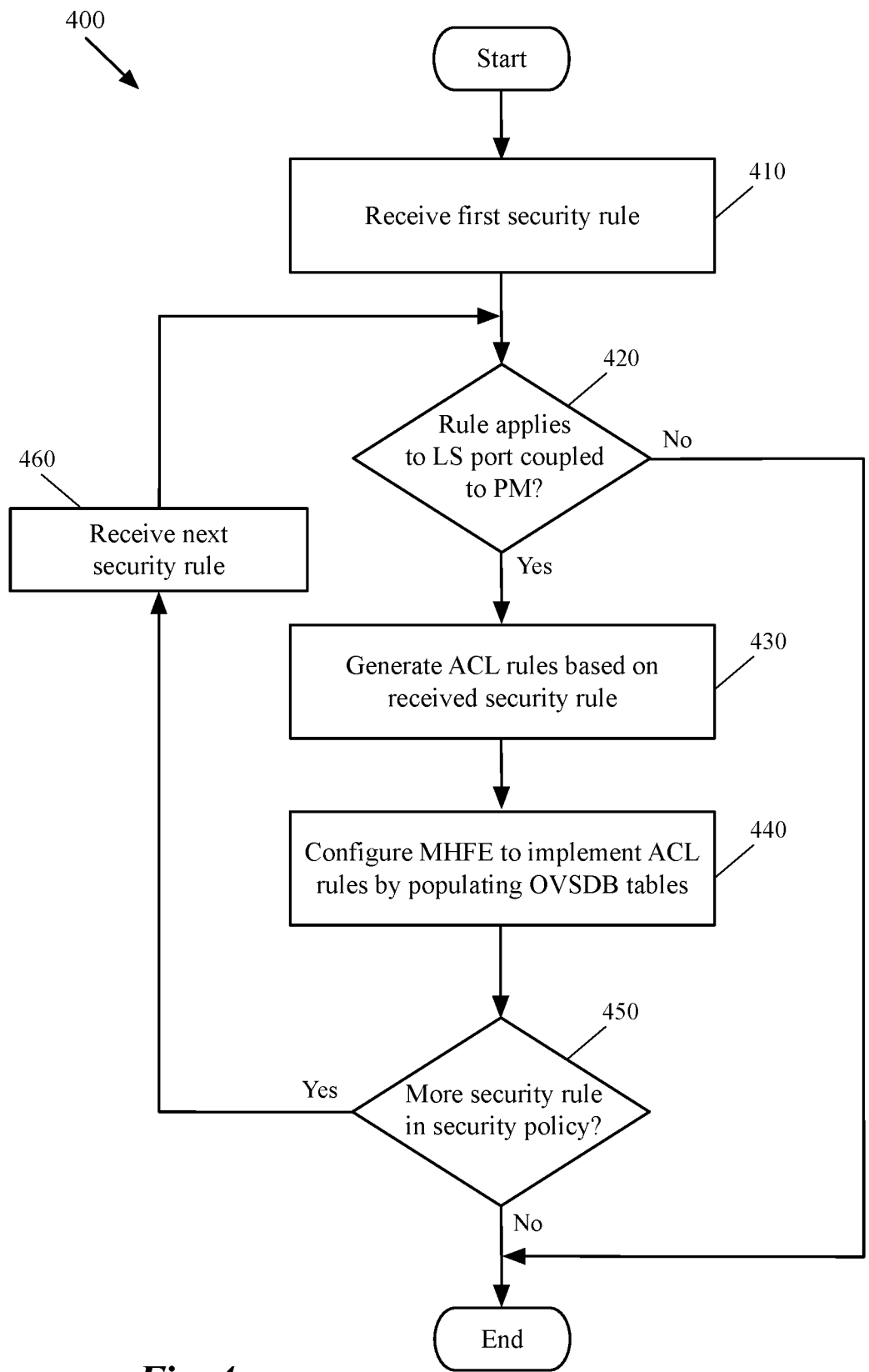
FIG. 4 conceptually illustrates a process of some embodiments that generates ACL rules for an MHFE based on a security rule of a security policy, and configures the MHFE to apply the ACL rules on the network traffic.

FIG. 4 conceptually illustrates a process 400 of some embodiments that generates ACL rules for an MHFE based on a security rule of a security policy, and configures the MHFE to apply the ACL rules on the network traffic. The process 400 of some embodiments is performed by the management and control planes of a logical network. The process starts by receiving (at 410) a first security rule of a security policy that is defined for a logical network. As described above, a user may define a security policy (e.g., through API calls to a manager of the logical network) that includes several different security rules. A security rule, in some embodiments, is a high level rule for a network traffic from one or more source nodes to one of more destination nodes.

The high level security rule of some embodiments includes a security group that defines the source nodes of the traffic, a security group that defines the destination nodes for the traffic, and a security group that defines the points at which, the security rule should be enforced. The security rule also includes an action that should be taken if the network traffic (e.g., a data packet) matches the rule (i.e., the identification data of the packet matches the identification data stored in the rule). The different actions, in some embodiments, include dropping the packet, denying the packet (e.g., dropping the packet and sending a message to the source node that the packet did not pass through), allowing the packet, or redirecting the packet to a different destination. Some other embodiments provide security rules that specify other actions to be taken once the source and destination of the packet matches the source and destination specified in the security rule.

The process then determines (at 420) whether the security rule should be enforced on a logical switch that is coupled to a physical machine (i.e., a logical port of the logical switch is mapped to a physical port of a hardware switch to which the physical machine is connected). The process of some embodiments makes such a determination by inspecting the AppliedTo tuple (field) of the security rule. If this field contains the logical switch, the process determines that the security rule should be applied to the hardware switch (i.e., to the switch's physical port).

It should be understood that the AppliedTo field does not have to specifically identify the logical switch for the process to determine the rule covers the physical machine. As described above, the AppliedTo field may contain a security group. As such, if a security group, in any shape or form, includes the logical switch to which a physical machine is coupled, the process would determine that the rule has to be applied to the physical switch to which the machine is connected. For example, if the AppliedTo filed specifies an entire logical network (e.g., of a tenant of a datacenter) as the security group, the rule has to be applied to every logical forwarding element of the logical network, including the logical switch to which the physical machine is connected.

When the process determines that the security rule does not apply to the logical switch that is coupled to the physical machine, the process ends. It should be understood that ending here means that the process 400 (e.g., performed by the management and control planes), which is only for generating security rules for an MHFE ends. Otherwise, other processes that generate firewall rules (e.g., distributed firewall rules) for the logical switch which is implemented by other managed forwarding elements continue to generate these firewall rules (based on the defined high level security rule) for the host machines that implement the logical switch. For example, when the management and control planes receive a security rule with an AppliedTo field that specifies a logical forwarding element that is implemented by several MSFEs, but not by an MHFE, these planes generate the required firewall rules to be applied by security agents that run on the same host machines on which the MSFEs operate. However, no ACL rule will be generated for the MHFE, since the MHFE does not implement the logical forwarding element.

When the process determines (at 420) that the security rule should be applied to the logical switch that is coupled to the physical machine, the process generates (at 430) the required ACL rules, based on the received security policy, to be stored at an ACL table of the hardware switch. As described above, a single security rule can be translated to several different ACL rules in some embodiments. For example, when a security rule specifies multiple source nodes as the source of the rule, some embodiments generate multiple ACL rules each of which identifies one of the source nodes as the source of the ACL rule (e.g., each ACL rule has a different source IP address specified in the corresponding security group of the source node).

Additionally, some embodiments may also generate a set of ACL rules that has the source node specified in the security group, as the destination node of the ACL rule. That is, a security policy can be translated to many firewall rules that are implemented in different host machines at different security levels (e.g., at MSFE level, at VNIC level, at virtual port level, etc.). At the same time, a firewall rule that is implemented in a host machine can be translated to more than one ACL rules that are implemented at an MHFE.

For example, a defined security rule of a security policy may specify that virtual application servers' communication with a physical database server is allowed (e.g., on a destination port X). When a controller of some embodiments receives such a security rule, the controller, in addition to generating ACL rules that each includes a different source application tier VM and the same destination database tier server, proactively generates ACL rules that specify that a response from the physical server to the application VMs should also be allowed. The controller also specifies that the reverse communication should be allowed only if the packets from the physical database server do not show a TCP initiation demand (e.g., through a set flag in the TCP header of the packet). This would ensure that if the database server is compromised (e.g., is under malicious attack), the logical network remains unharmed.

After generating the ACL rules for the MHFE and saving the generated rules on an ACL table of the MHFE, the process of some embodiments configures (at 440) the MHFE to implement these ACL rules on a set of corresponding physical ports of the MHFE. As will be described in more detail below by reference to FIGS. 6-8, the process of some embodiments does so by propagating an open source database stored on the MHFE which defines the forwarding behavior of the MHFE for the physical ports of the MHFE that are integrated with a logical network.

Since the source and destination nodes, as well as the AppliedTo field, include a security group, each of these elements can dynamically expand or shrink and the corresponding firewall rules and ACL rules will be automatically updated (e.g., generated or removed) in the configuration of security agents and MHFEs. For example, a source node that is defined to be a security group containing a group of server VMs can grow dynamically (e.g., a new server VM can be added to the group), which results in generation of new ACL rules automatically. The newly generated ACL rules will then be automatically pushed down to the corresponding MHFEs. In other words, some embodiments direct (e.g., through an open source protocol such as OVSDB protocol) the MHFEs (e.g., third-party TOR switches) to update ACL tables on the fly to account for dynamic adjustment of the security groups that include one or more physical ports of the MHFEs.

Next, the process determines (at 450) whether there are more security rules left in the security policy. If the process determines that there are more security rules, the process receives (at 460) the next security rule in the security policy and returns to operation 420 to determine whether the received security rule should be applied to the logical switch to which the physical machine is coupled. On the other hand, if the process determines that the processed security rule was the last rule defined in the security policy, the process ends.

The specific operations of the process 400 may not be performed in the exact order shown and described. The specific operations may not be performed in one continuous series of operations, and different specific operations may be performed in different embodiments. Additionally, one of ordinary skill in the art would realize that the process 400 could be implemented using several sub-processes, or as part of a larger macro process.

Figure 5:
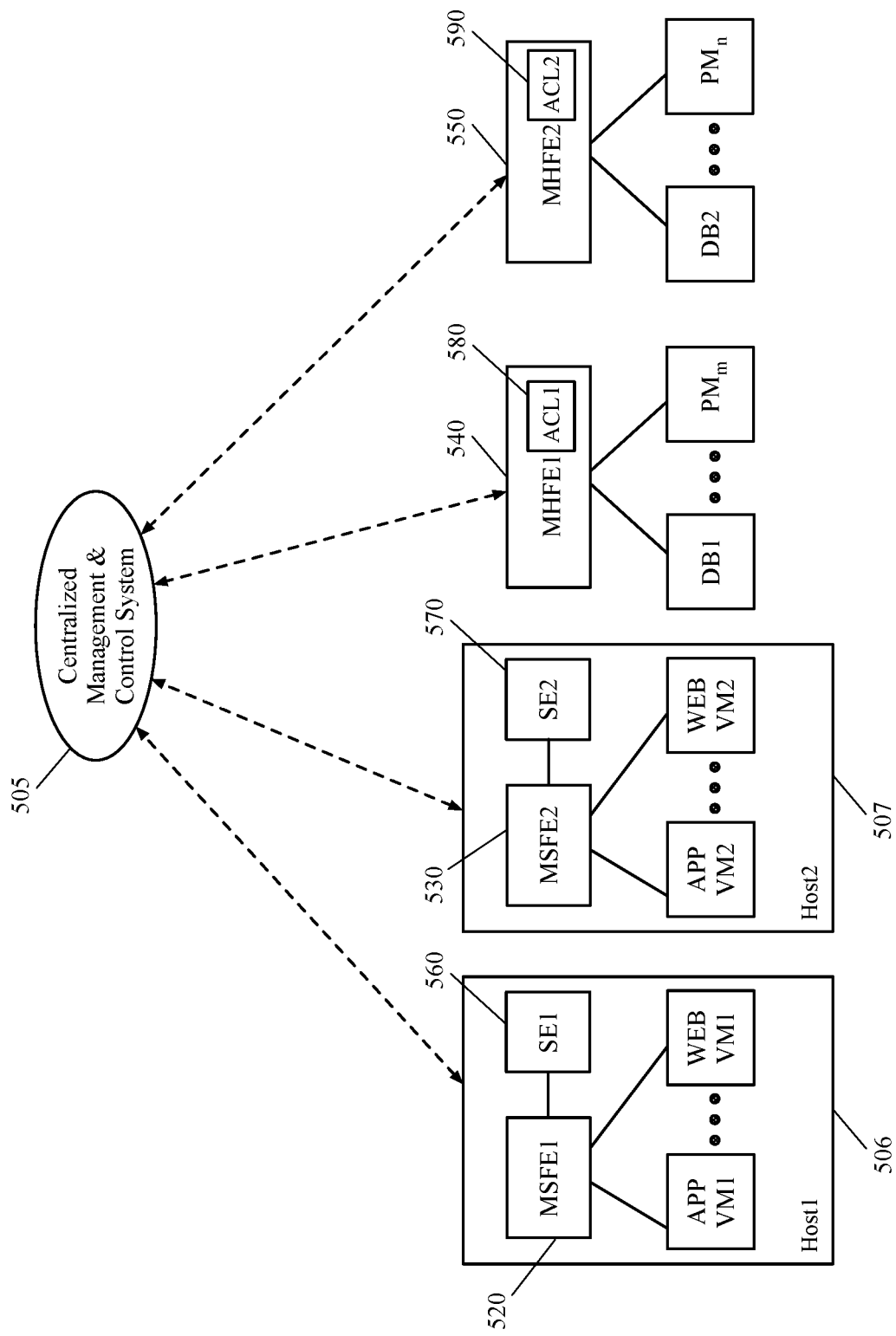
FIG. 5 illustrates management and control planes of some embodiments that (1) configure several managed forwarding elements (hardware and software) to implement a logical network and (2) configure the MHFEs to implement a security policy of the logical network.

FIG. 5 illustrates management and control planes of some embodiments that (1) configure several managed forwarding elements (hardware and software) to implement a logical network and (2) configure the MHFEs to implement a security policy of the logical network. Specifically, this figure shows a network management and control system 505 exchanging logical forwarding and configuration data with the managed forwarding elements 520-550 to implement one or more logical forwarding elements and create tunnels between the various software and physical forwarding elements.

The centralized management and control system 105 includes one or more managers (e.g., manager computers and/or applications) and several controllers (e.g., controller computers and/or applications) that are responsible for (1) receiving definitions of different logical network elements of different logical networks (e.g., belonging to different tenants), and (2) distributing the logical configuration and forwarding data to the managed forwarding elements (hardware and software) to implement the logical forwarding elements of the logical networks. The centralized management and control system 105 also receives a definition of security policy for a logical network (e.g., from a tenant), generates a set of distributed firewall rules and a set of ACL rules based on the defined security policy, and configures the security agents and MHFEs to apply the generated firewall rules and ACL rules, respectively.

The host machine 506 receives common forwarding and security data (e.g., at a local controller that executes on the host machine) that can be applied in several hosts and converts this data to customized forwarding and security data that can be applied in the host machine 506. For example, a local controller of the host machine 506 (not shown) receives 6-tuple distributed firewall rules (typical 5-tuple firewall rule plus the AppliedTo tuple) from a controller machine and based on what logical forwarding elements in the AppliedTo field are implemented by the MSFE 520, converts the received rules to 5-tuple rules, and configures the security agent 560 to implement the converted firewall rules on the corresponding logical forwarding elements. Similarly, a local controller executing on the host machine 507 receives the 6-tuple distributed firewall rules from the controller machine, converts the received rules to 5-tuple rules based on the logical forwarding elements implemented by the MSFE 530, and configures the security agent 570 to implement the converted firewall rules.

The security agent 560 inspects the network traffic forwarded to and received from the virtual machines APP-VM1 and WEB-VM1, or any other data compute node that executes on the host machine 506 (belonging to the same logical network or a different logical network), based on the firewall rules received from the management and control system. The security agent 570 also inspects the network traffic forwarded to and received from the virtual machines APP-VM2 and WEB-VM2, or any other data compute node that executes on the host machine 507, based on the firewall rules received from the management and control system.

The management and control system 105 also communicates with the MHFEs 540 and 550 (e.g., through each MHFE's controller) in order to implement the logical network elements on the MHFEs and connect one or more of the physical machines connected to these MHFEs (e.g., DB1, DB2, or any other physical machine) to each other and to other end machines connected to the logical network. The MHFEs 540 and 550 also receive the generated ACL rules (e.g., from their corresponding controllers) and store these ACL rules in the ACL tables 580 and 590, respectively.

After receiving the logical network configuration data from the MSFE and MHFE controllers, the MSFEs and MHFEs establish tunnels (e.g., a Virtual Extensible LAN (VXLAN) tunnel, a Stateless Transport Tunneling (STT) tunnel, etc.) between themselves (e.g., a full mesh of tunnels between all of the configured forwarding elements that implement the logical network) in order to exchange the logical network packets between the endpoints that are coupled to the MSFEs and MHFEs. That is, each of the managed forwarding elements serves as a tunnel endpoint in some embodiments, and receives addresses (e.g., IP addresses) of the other tunnel endpoints, as well as other information to use to encapsulate and decapsulates packets (e.g., logical network and logical port identifiers, etc.). In some embodiments, the MHFEs store the tunnel endpoint addresses of the other MSFEs and MHFEs that implements the logical forwarding elements and their different logical ports in a particular tunnel endpoint locator table of an open source database such as hardware VTEP database. The tunnel endpoint locator table is one of several database tables that are configured on the MHFE by the network management and control system.

In some embodiments, the management and control system propagates the database tables with the logical network data. The management and control system distributes the logical network data (the forwarding tables data) to each MHFE controller through a first protocol to be subsequently distributed to the MHFEs through a second, different protocol. The reason for using different protocols is that an MHFE (e.g., a third-party TOR switch) does not necessarily have the required platform, operating system, or applications to run or execute a controller process and/or application similar to the local controllers of MSFEs. Each of the MHFE controllers of some embodiments is a separate software process from the central controllers in the management and control system 505. An MHFE controller may operate on the same machine as one of the controllers, or on a different machine.

As described above, the management and control system 505 (or local controllers of the MHFEs) communicates with each MHFE over an open source protocol (e.g., OVSDB protocol) to exchange forwarding state (e.g., L2 and/or L3 forwarding state). For instance, the MHFE 550 might send an update notification to the network management and control system (through the local controller of the MHFE) regarding a learned MAC/IP address of a physical machine (e.g., a new database server, a new desktop computer, etc.) that is connected to one of the MHFE's ports. The central management and control system 505 can then compute the necessary logical data and push this logical data down to the MSFEs 520 and 530.

The MHFEs 540 and 550 also receive configuration information from the management and control system. For instance, the MHFE 540 might receive the MAC/IP address of the virtual machines that are coupled to the MSFEs 540 and 550. The MHFE 540 of some such embodiments then calculates its own forwarding data based on the forwarding information it receives from the management and control system. The method of computation of the forwarding data by an MHFE (e.g., a third-party hardware switch) can vary from one switch vendor to another.

A) Applying ACLs ON Logical Switches

As described above, in order to configure an MHFE to implement the different logical forwarding elements (e.g., logical L2 switches, L3 routers, middleboxes, etc.) of a logical network, some embodiments propagate an open source database such as a hardware VXLAN tunnel endpoint (VTEP) database schema (some embodiments refer to an MHFE as a hardware VTEP since it implements a tunnel endpoint to communicate with other software and hardware managed forwarding elements) stored on the MHFE. Some such embodiments propagate the database using an open source protocol (e.g., an open vSwitch database management (OVSDB) protocol) that is recognizable and used by the MHFE. Such an open source protocol requires minimal software on the MHFE to enable the implementation of the logical network forwarding elements (e.g., logical L2 and L3 forwarding elements) in order to communicate with the other machines connected to the logical network as well as other external networks. The management and control plane of some embodiments also populate an ACL table stored on the MHFE with the generated ACL rules.

Figure 7:
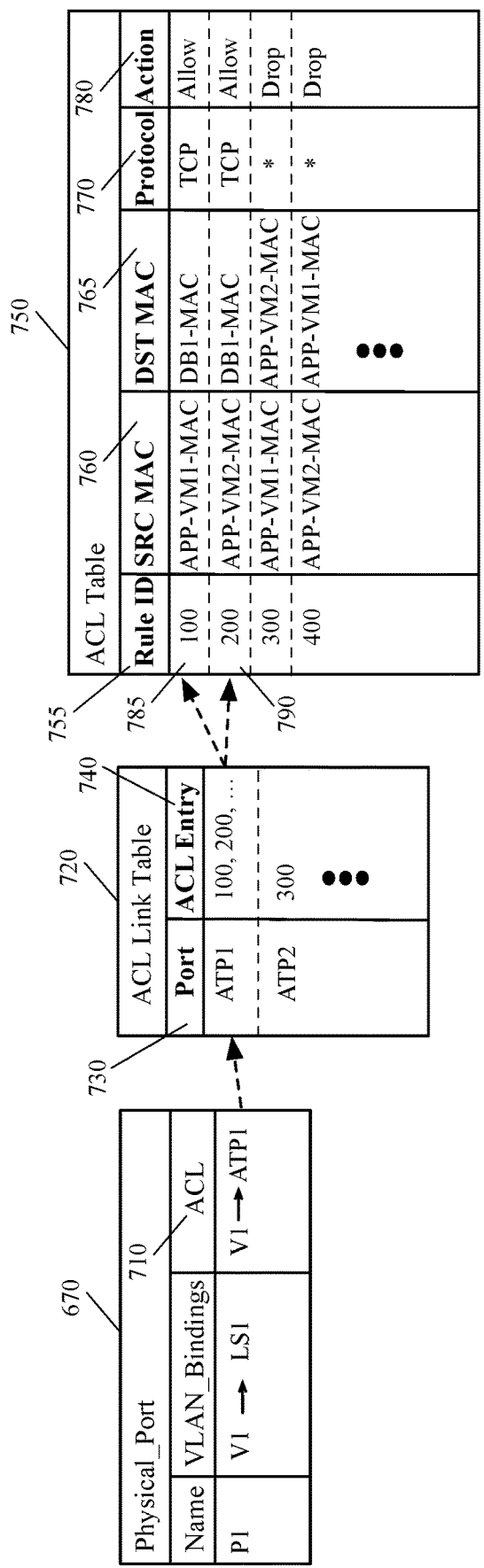
FIG. 7 illustrates how configuration of different database tables of a database schema on an MHFE enables the MHFE to apply ACL rules on logical ports of a logical switch implemented by the MHFE.

In order to tie the ACL table to the open source database (to apply the rules on the set of LFEs), some embodiments propagate a particular table of the database such that each record of the table creates an association between a port (or interface) of an LFE stored in a logical forwarding table and one or more ACL rules stored in the ACL table. This way, when a packet is received at the port, the packet is inspected and acted upon based on the ACL rules associated with the port. FIG. 7 in this section illustrates a linking table that links a logical port of a logical switch to one or more ACL rules of an L2 ACL table, while FIG. 8 in the next Section B illustrates another linking table that links a logical port of a logical router to one or more ACL rules of an L3 ACL table (which is the same ACL table in which the L2 ACL rules are stored in some embodiments).

Figure 6:
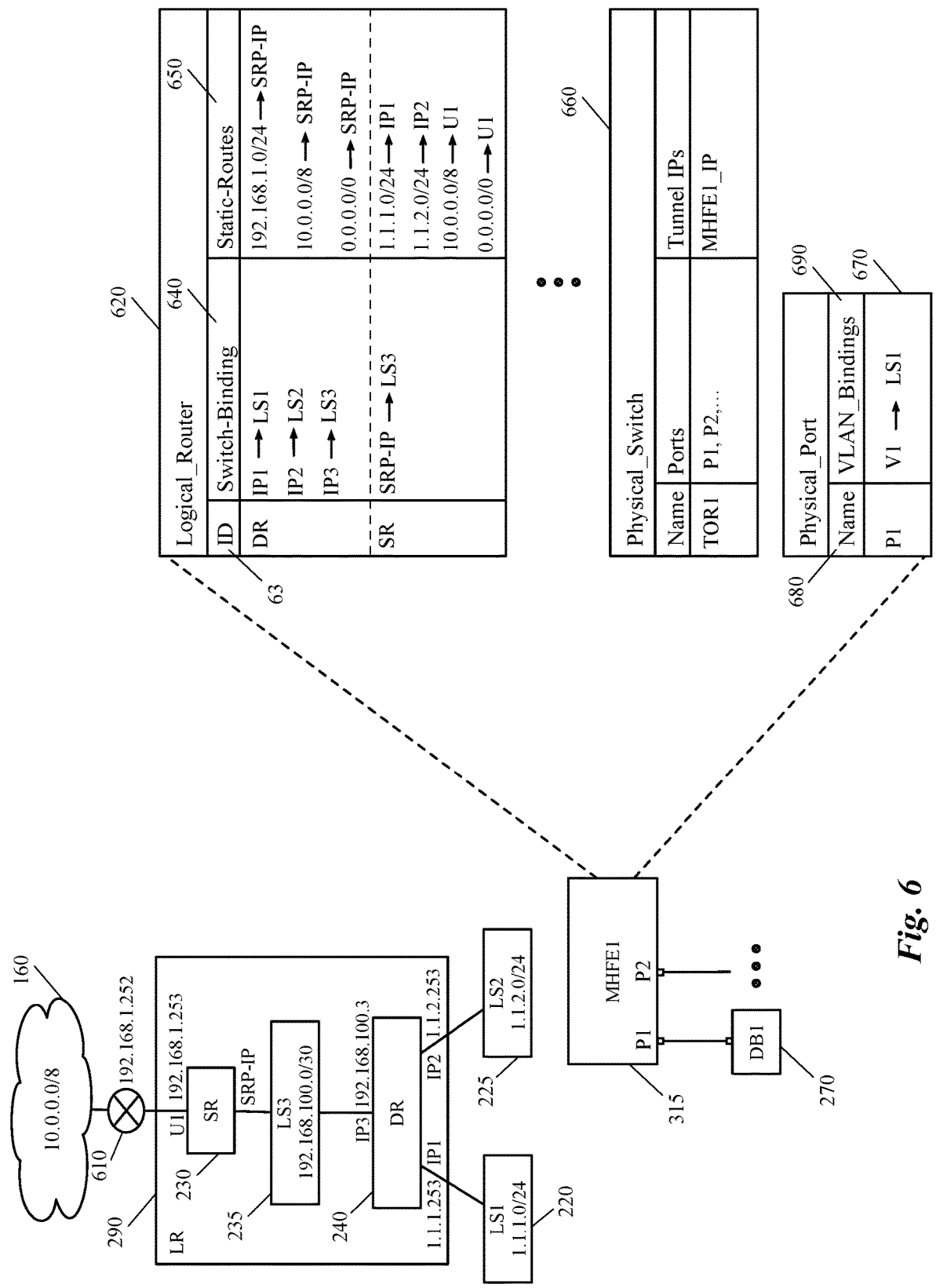
FIG. 6 illustrates a few database tables of an open source database schema for an MHFE that are propagated with forwarding data generated by the network management and control system (and by the MHFE).

FIG. 6 illustrates a few example tables of an open source database schema for an MHFE that are propagated with forwarding data generated by the network management and control system (and by the MHFE as for the runtime discovered data). This figure shows the same configuration view 290 of the logical router shown in FIG. 2 except that in this figure some of the forwarding data with which the open source database is propagated are also shown. Specifically, in this figure each interface of the logical router's routing components (i.e., DR and SR) is assigned an example IP address to show how some of the tables of the database are populated with these IP addresses.

The DR 240 is assigned the same two southbound interfaces of the logical router 210, which connect to the logical switches 220 (LS1) and 225 (LS2). The transit logical switch 235 (LS3) is assigned a subnet of 192.168.100.0/30. Some embodiments require the subnet assignment of each logical switch be unique among the logical switches that logically connect (directly or indirectly) to the logical router 290. Each of the DR 240 and SR 230 also includes an interface that connects to the transit logical switch 235, and has an IP address in the subnet of the transit logical switch. The northbound interface U1 is assigned to the SR 230 and is connected to an external (physical) router 610 which connects the logical network to the external network 160.

The RIB of the DR is assigned connected routes based on the subnets configured on its various southbound and northbound interfaces. These are the subnets configured for (i) the transit logical switch configured between the DR and SR components of the logical router, and (ii) any logical switches on its southbound interfaces. These logical switches on the southbound interfaces are user-defined logical domains to which data compute nodes connect. In addition, any static routes that egress from an uplink of the logical router and static routes that egress from a southbound interface of the logical router are all included in the RIB of the DR. On the other hand, for each southbound interface of the logical router, some embodiments add a route for the corresponding network to the RIB of each SR. This route points to the northbound DR interface as its next-hop IP address. Furthermore, any other routes configured for the logical router that egress from the southbound interface are copied to the SR with the same northbound DR interface as the next-hop IP address. Additionally, a static route of the logical router that egresses from an uplink (e.g., U1) is copied to the RIB of the SR.

The management and control system of some embodiments distributes configuration data of the logical forwarding elements to the MSFEs in a manner that is different than to the MHFEs. As described above, some embodiments compute and distribute the logical configuration and forwarding data to each MHFE using an open source protocol that is recognizable and used by the MHFE. In some other embodiments, the management and control system distributes the logical network data to a particular controller that manages the MHFE using a proprietary protocol and the particular controller distributes the data to the MHFE using the open source protocol. The controller configures the MHFE by populating different tables of the open source database schema with configuration and forwarding data.

FIG. 6 illustrates three of such tables, two of which are specifically used by the MHFE to implement a logical network's security policy through ACLs. This figure shows the MHFE 330 of FIG. 3 above, which maps a logical port of the logical switch 220 to one of the MHFE's physical ports, to which the physical database server 270 is connected. As shown, the MHFE stores different database tables among which are logical router table 620, physical switch table 660, and physical port table 670. As will be described below by reference to FIGS. 7 and 8, MHFE 330 uses logical router table 620 and physical port table 670 to apply the ACL rules stored in an ACL table on one or more ports of the logical routers and logical switches of a logical network.

As shown in the figure the logical router table 620 (Logical_Router table) is a table that is configured to map the IP (IPv4 or IPv6) addresses of logical ports of a logical router to one or more logical switches. Since a logical router includes different routing components (distributed and service routers), the management and control planes of some embodiments configure each of these routing components as a separate router with different interfaces that are included in this table. As illustrated, each record in the logical router table 620 includes an ID field 630 that identifies the router, a switch binding field 640 that maps the different IP addresses of the different ports of the routing component to a logical switch, and a static route field 650 that specifies the different static routes of the routing component.

The ID fields includes a row (record) for the distributed router 240 and a row for the service router 230 (SR). The corresponding switch binding field for DR has the IP address of the logical port that is coupled to logical switch 220 (i.e., IP 1.1.1.253/24), and is mapped to the logical switch 220 (LS1). Similarly, the IP address of the other southbound interface of the DR 240 (i.e., IP 1.1.2.253/24) is mapped to the logical switch 225 and the IP address of the northbound interface of the DR (i.e., IP 192.168.100.3/30) is mapped to the transit logical switch 235. The static routes populated in the static routes field 650 show that the subnet on which the uplink U1 is located (192.168.1.0/24) is reached via the southbound interface of the SR (i.e., SRP-IP). Additionally, both of the network 10.0.0.0/8 and the default network 0.0.0.0/0 are reached via the logical ports SRP-IP. For the sake of brevity, the static routes for the service router 230 are not described here since the fields of interest for this subject are the fields that identify the routing components and its different southbound and northbound interfaces (i.e., fields 630 and 640).

The figure also shows a physical switch table 660 (Physical_Switch table) which includes a descriptive name for the MHFE (TOR1 in this example), the physical ports within the switch, and the tunnel endpoint address of the switch (i.e., IPv4 or IPv6 addresses on which the switch may originate or terminate tunnels), which in the illustrated example is the IP address MHFE_IP1. On the other hand, the physical port table 670 (Physical_Port table) includes the ID field 680 that identifies each port of the MHFE and a VLAN binding field 690 that identifies how VLANs on the physical port are bound to logical switches.

If, for example, the map contains a (VLAN, logical switch) pair, a packet that arrives on the port in the VLAN is considered to belong to the paired logical switch. In other words, this field maps a logical switch to a physical port of the MHFE and as such can be used to link one or more of the ACL rules defined for the logical switch to the physical port of the MHFE. It should be understood that each of the demonstrated tables may have one or more other fields which are not shown to simplify the description. The ID field 680 and VLAN binding field 690 of this table show that for physical port P1 of the hardware switch MHFE1, the VLAN V1 is mapped to the logical switch LS1. That is, when a packet is received at the port P1 of the hardware switch (i.e., received from or destined for the database server DB1, which is on a physical network identified as V1), the packet is considered to belong to logical switch LS1 and is forwarded according to the pipeline of this logical switch.

FIG. 7 illustrates how configuration of different database tables of a database schema on an MHFE enables the MHFE to apply ACL rules on logical ports of a logical switch implemented by the MHFE. More specifically, this figure shows that for one or more ACL rules that the management and control planes of some embodiments generate based on a defined security policy, some embodiments employ an intermediary table that links the ACL rules to one or more logical ports of a logical switch at which the ACL rules should be applied to the network traffic that passes through the ports.

As shown in the figure, the intermediary table 720 (ACL Link Table) ties the physical port P1 of the hardware switch 330 (MHFE1) in FIG. 6, to ACL rules 785 and 790 of the ACL table 750. That is, for each port of the MHFE, some embodiments define a new field (column) 710 in the physical port table 670 that maps the same pair of VLAN-logical switch (i.e., V1-LS1), to an ACL table port record in the linking table 720. For example, the illustrated field 710 of the table includes a mapping value that maps this port to a record of the ACL link table, the port field 730 of which contains ATP1 (i.e., the first record of the table 720). Each record of the liking table 720, on the other hand, maps a physical port of an MHFE to one or more records (rules) of the ACL table 750. In the illustrated example, at least rules 785 and 790 of the ACL table could be applied to the physical part P1 of the MHFE (depending on the source of the packet received by this port, one of these two rules will be applied on the packet).

The ACL table 750 includes several different fields (some of which are not shown in the figure for simplicity of description) including rule ID (or ranking) field 755, source MAC address field 760, destination MAC address field 765, protocol (or service) field 770, and action field 780. As illustrated, each rule is associated with a rank because two or more rules might apply to the same packet that is received at a port. In some embodiments, the ACL rules in a propagated ACL table are ranked based on their priority of enforcement. That is, the ACL rules are sorted in the ACL table based on their priority and each ACL rule has a corresponding priority rank in the ACL table. As such, when a particular packet matches more than one ACL rule in the table (i.e., the source and destination headers in the packet match the same source and destination addresses stored in two or more records of the ACL table), the highest ranked rule will be applied to the packet (i.e., the action that is defined in the highest ranked rule record will be applied to the packet).

For example, one rule in the ACL table may have a wild card for a source MAC/IP address of a packet and "X" as the destination MAC/IP address of the packet. At the same time, a second ACL rule may have "Y" as the source, and "X" as the destination address of the packet. As such, for a packet with "Y" as the source address and "X" as the destination address, both of these rules of the ACL table would match the packet. However, only the rule that has a higher ranking will apply to the packet. Wild card values such as "*" are used by some embodiments in any of the fields of an ACL table (similar to firewall tables), which signifies all possible values for that field.

As stated before, an ACL table includes different ACL rules that are generated by management and control planes of a network based on the security policy that a user (e.g., a tenant of a datacenter) has defined for the logical network. As an example, one of the security rules defined in the security policy 120 by reference to FIG. 1 specifies that any network traffic from application tier machines to database server DB1 should be allowed where the enforcement point should be logical switch LS1 (i.e., the fourth security rule in the security policy 120). This rule, which simply identifies three different security groups APP, DB1, and LS1, has been translated to multiple ACL rules in the ACL table 750, including the rules 785 and 790.

Specifically, the ACL rules 785 and 790 specify that any packet with a source MAC address of APP-VM1-MAC or APP-VM2-MAC (i.e., originated from the application server VM1 or application sever VM2) and a destination MAC address of DB1-MAC (i.e., destined for the physical database server DB1) that uses TCP service should be allowed to pass through physical port P1 of the hardware switch MHFE1. Again, it is important to note that not all of the different fields of the ACL table are shown in the figure in order to simplify the description. For example, the source and destination ports, or the source and destination IP addresses are not shown for simplicity of description.

Moreover, it should be understood that although the ACL table illustrated in this example only includes layer 2 source and destination addresses, an L2 ACL table of some embodiments also includes layer 3 source and destination addresses (IP addresses) as part of the identification data for a packet. That is, although the ACL table shown in this figure is an L2 ACL table, this table may include source and destination IP addresses that apply an ACL rule on a packet received by a physical port of an MHFE based on the source and destination IP addresses of the packet (i.e., stored in the layer 3 packet headers of the packet).

B) Applying ACLs on Logical Routers

Figure 8:
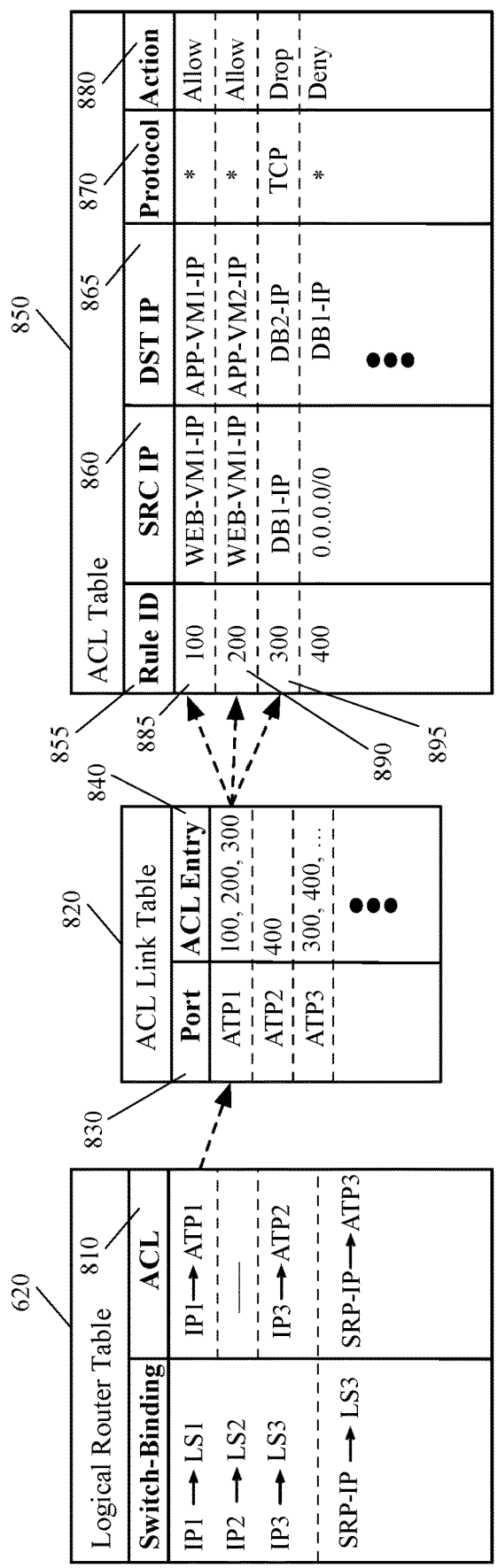
FIG. 8 illustrates how configuration of different database tables of a database schema on an MHFE enables the MHFE to apply ACL rules on logical ports of a logical router implemented by the MHFE.

FIG. 8 illustrates how configuration of different database tables of a database schema on an MHFE enables the MHFE to apply ACL rules on logical ports of a logical router implemented by the MHFE. More specifically, this figure shows that for one more ACL rules that the management and control planes of some embodiments generate based on a defined security policy, some embodiments employ an intermediary table that links the ACL rules to one or more logical ports of a logical router on which the ACL rules should be applied.

As shown in the figure, the intermediary table 820 (ACL Link Table) ties the logical port of the DR 240 in FIG. 6 that has an L3 address of IP1 to ACL rules 885-895 of the ACL table 850. That is, for at least one logical port of one of the routing components (e.g., DR and SRs) of the logical router 290, some embodiments define a new field (column) 810 in the logical router table 640 that maps the IP address of the routing component, to a Port field 830 in a record of the linking table 820. Not every logical port of a logical router, however, should be linked to a set of ACL rules in the ACL table. As an example, the logical port of the distributed router that has an IP address of IP2 (i.e., in the second record of the table 620) is not linked to any ACL rule in the ACL table.

As another example for a logical port of the DR that does have ACL rules defined for it, the illustrated figure shows that field 810 in the first record of the table 620 includes a mapping value that maps a port of the DR (with IP address of IP1) to a record of the ACL link table, the port field 830 of which contains ATP1 (i.e., the first record of the table 820). Each record of the liking table 820, on the other hand, maps a logical port of a routing component to one or more records (rules) of the ACL table 850. In the illustrated example, at least rules 885-895 of the ACL table could be applied to the logical port of the distributed router that has IP address of IP1 (depending on the source of the packet received by this port, one of these two rules will be applied on the packet).

The ACL table 850 includes several different fields (some of which are not shown in the figure for simplicity of description) including rule ID (or ranking) field 855, source IP address field 860, destination IP address field 865, protocol (or service) field 870, and action field 880. This ACL table includes the different ACL rules that are generated by the management and control planes of the network based on the security policy that a user has defined for the logical network.

For example, one of the security rules defined in the security policy 120 shown in FIG. 1 indicates that no network traffic from database server DB1 to database server DB2 should be allowed, where the enforcement point is the logical network LN1 (i.e., the sixth security rule in the security policy 120). This rule, which simply identifies three different security groups DB1, DB2, and LN1, has been translated to multiple ACL rules (not all of which are shown) in the ACL table 850, including the ACL rule 895. As illustrated in FIG. 2, the database server DB1 is coupled to logical switch 220, while the database server DB2 is logically coupled to the logical switch 225. As such, the user has selected the whole logical network LN1 which includes both of these logical switches, as well as the logical router that logically connects these logical switches, as the enforcement point for the security rule.

The ACL rule 895 specifies that any packet with a source IP address of DB1-IP and a destination IP address of DB2-IP (i.e., any packet from database server DB1 to database server DB2) that uses any type of service (the wild chard value "*" indicates that any type of service is acceptable for this field) should be dropped and not pass through the logical port of the DR with IP address IP1. It should be understood that not all the fields in the ACL table is shown in order to simplify the description. For example, the ACL table also has different fields that include the source and destination port numbers among other fields.

Additionally, it should be understood that although the ACL tables 750 and 850 shown as in FIGS. 7 and 8 are illustrated as separate ACL tables that have different fields (columns), some embodiments use the same ACL table for implementing L2 and L3 ACLs on MHFEs. That is, the MHFEs of some embodiments store a single ACL table that has different fields for layer 2 and layer 3 source and destination addresses and each of the ACL link tables described above, links a record of the physical port table or logical router table to different records of this single ACL table.

Similarly, even though the ACL link tables 720 and 820 in FIGS. 7 and 8 are shown as separate tables, some embodiments use the same ACL link table for linking the different ports of logical switches and routers to a single ACL table that includes all the ACL rules for these logical forwarding elements. The single ACL link table of some such embodiments includes different ACL table pointer fields in its Port column that are associated with different Switch-ACL and VLAN-ACL map fields in the physical port and logical router tables, respectively.

Figure 9:
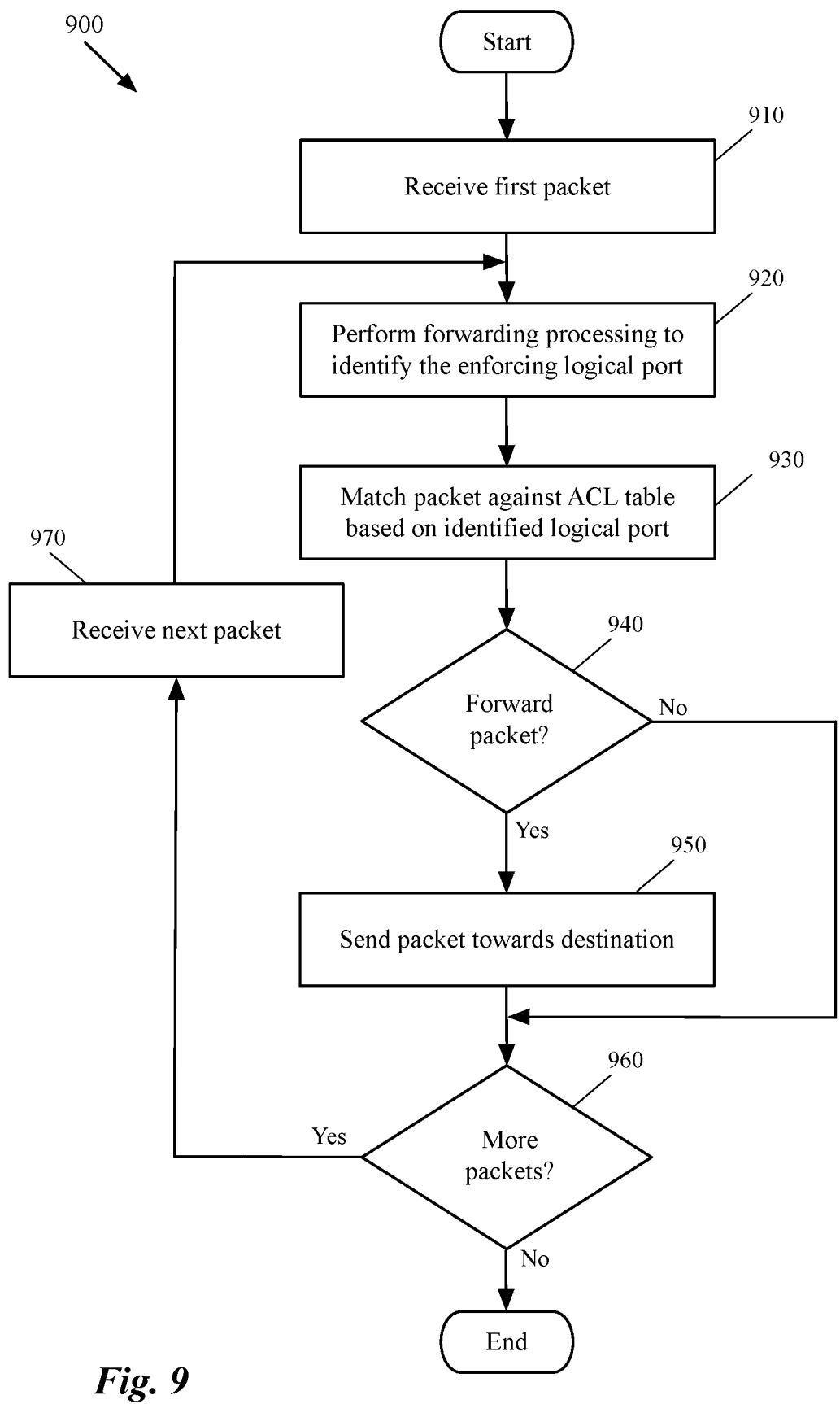
FIG. 9 conceptually illustrates a process of some embodiments for applying the ACL rules generated for a logical network, on network traffic that passes through an MHFE that is logically connected to the logical network.

FIG. 9 conceptually illustrates a process 900 of some embodiments for applying the ACL rules generated for a logical network, on network traffic that passes through an MHFE that is logically connected to the logical network. This figure will be described by two examples illustrated in FIGS. 10 and 11 below. The process 900 of some embodiments is performed by an MHFE (e.g., a TOR switch) that is configured to implement L2 and/or L3 ACLs to enforce the security policy of a logical network. The process starts by receiving (at 910) a first packet that is sent from a physical machine connected to a physical port of the MHFE, or from another data compute node (e.g., another physical machine, another VM, etc.) to the physical machine connected to the MHFE.

The process then performs (at 920) a set of forwarding processing for the pipelines of logical forwarding elements that are on the logical path of the packet towards its destination. These forwarding processing identifies the enforcing point on which, an ACL rule of an ACL table should be applied. As described above, the MHFE of some embodiments performs the forwarding processing based on the configuration data (initial configuration data received from the management and control system and runtime data discovered at runtime) the MHFE receives from the management and control planes (or the data plane at runtime) and stores in the different tables of a database.

For example, the forwarding processing performed on the packet may identify a logical port of a logical switch and/or a logical port of a logical router, through which the packet should be forwarded. It is important to note that a packet, during the first-hop processing on an MHFE, may be processed by several different logical ports of different LFEs, each of which is associated with a corresponding logical ACL rule of the ACL table. As such, a packet may be checked against the ACL table and its different rules multiple times before it is determined that the packet could continue on its path or it should be dropped (or denied).

Figure 10:
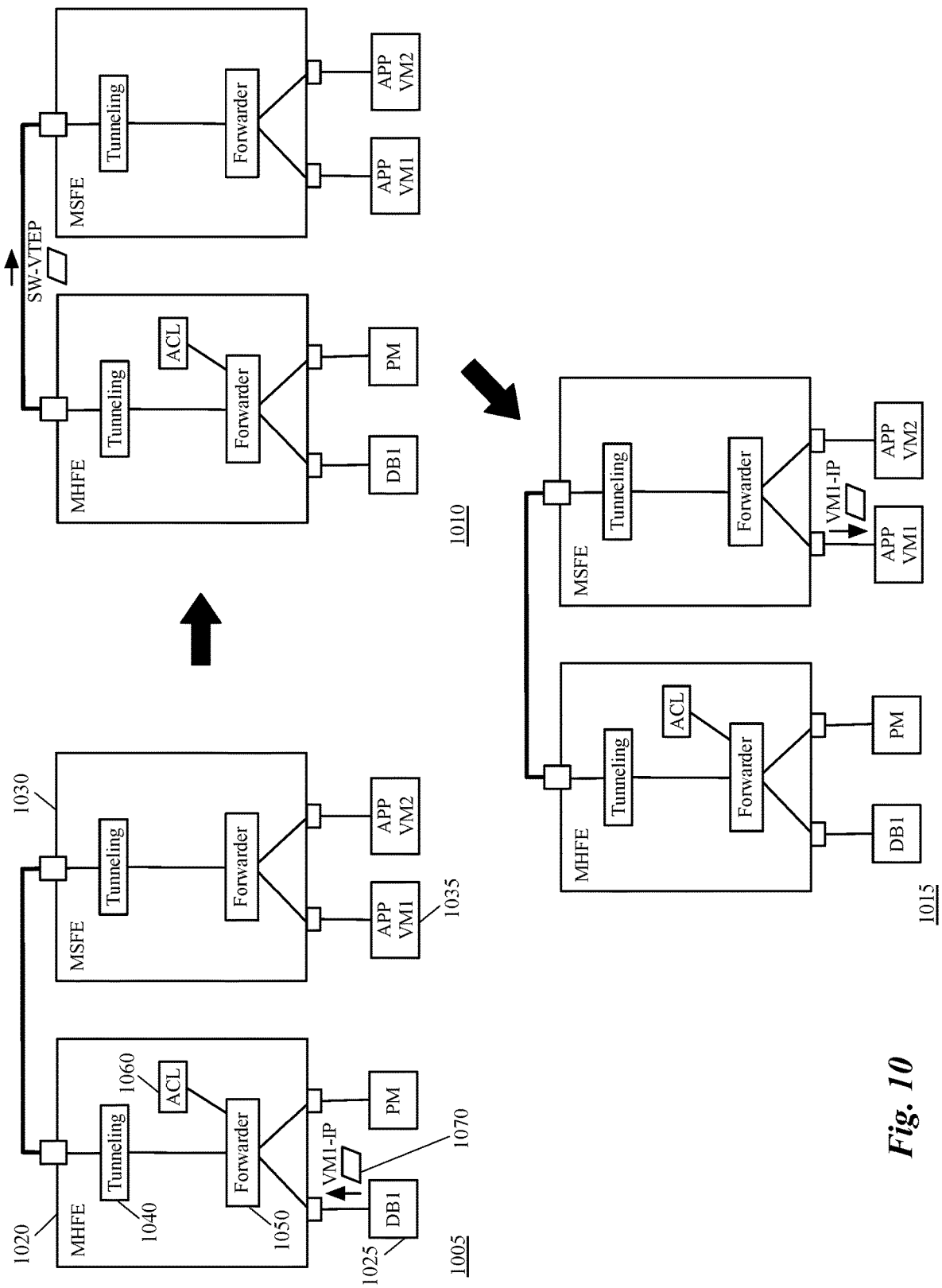
FIG. 10 illustrates an example of processing a packet, sent by a physical machine, at an MHFE and applying network security policy on the packet at the logical forwarding ports that process the packet.

FIG. 10 illustrates an example of processing a packet, sent by a physical machine, at an MHFE and applying network security policy on the packet at the logical forwarding ports that process the packet. Specifically, this figure shows, through three different stages 1005-1015, a packet being forwarded from a physical database server connected to an MHFE to an application virtual machine connected to an MSFE (both of MSFE and VM executing in a host machine that is not shown). The figure includes an MHFE 1020 and an MSFE 1030, a set of physical machines connected to the MHFE, including physical database server (DB1) 1025, and a set of virtual machines connected to the MSFE, including APP-VM1 1035. Each managed forwarding element includes a tunneling module 1040, a forwarder 1050, and an ACL table 1060. The managed forwarding elements 1020 and 1030 communicate logical network data through tunnels that they establish among between them.

It should be understood that each managed forwarding element of some embodiments includes many more modules that are not shown in the figure to simplify the description of the figure. For example, in some embodiments, the MHFE 1020 also includes an open source database that includes many different forwarding tables through which the switch performs forwarding processing. Additionally, some of the illustrated modules include different sub-modules that are not shown in this figure. For example, the forwarder module 1050 includes the pipelines of every logical forwarding element that the managed forwarding element implements (e.g., the pipelines of logical switches and routers shown in FIG. 2).

The first stage 1005 shows that machine DB1 has initiated and sent a packet 1070 through a port of the MHFE 1020 towards the machine APP-VM1 (as shown the packet has a destination IP address of VM1-IP). When the forwarder 1050 receives the packet, it starts executing the different pipelines of different LFEs that are on the logical path of the packet. As the logical network topology and its corresponding physical implementation in FIGS. 2 and 3 show, both of the end machines DB1 and APP-VM1 are logically connected to the same logical switch. However, DB1 is connected to the hardware switch MHFE1, while APP-VM is hosted in the host machine Host1.

Therefore, the forwarder module 1050 starts executing the pipeline of the logical switch to which both of the end machines are connected. By performing the forwarding processing for the logical port to which DB1 is connected, the forwarder module identifies the physical port of the switch (since the logical port is mapped to the identified physical port).

Returning to FIG. 9, the process 900, after identifying the logical port that is deemed to enforce the ACL rules, matches (at 930) the received packet against the ACL table. The process then determines (at 940) whether the action in a matched ACL rule specifies that the packet should be forwarded towards its final destination or alternatively dropped. When the process determines that the packet should continue on its logical path, the process forwards (at 950) the packet towards its final destination (e.g., to the destination end machine or to a next logical forwarding element to process the packet). The process the proceeds to operation 960 which is described below.

In the example of FIG. 10, the forwarder module 1050, after identifying the physical port P1 of MHFE1 as the port that has received the packet, uses the different database tables shown in FIG. 6 in order to determine which ACL rule of the ACL table 1060 should be applied to the packet. In the illustrated example, the forwarder module, after identifying the rule, realizes that a packet with these source and destination MAC addresses (or IP addresses) is allowed to be forwarded towards this particular destination. As such, the forwarder module, sends the packet to the tunneling module 1040. This is because, the forwarder module, based on the forwarding data, realizes that no other logical forwarding element is on the path of the packet and the packet should be sent from one port of the logical switch to the other port. Based on the forwarding tables, the forwarder module also knows that the other port of the logical switch is implemented by the MSFE 1030. One of ordinary skill in the art would realize that if the packet 1070 was destined for another machine that is coupled to the same MHFE 1020, the forwarder module 1050 would have forwarded the packet directly to the destination machine (without sending the packet to the tunneling module 1040 for encapsulation).

The second stage 1010 shows that the forwarder module 1050 has already sent the packet 1070 to the tunneling module 1040, which performs tunneling processing on the packet. More specifically, the tunneling module performs a lookup on the configuration database tables to identify a location (i.e., the IP address) of the remote MSFE for the destination end machine APP-VM1, and encapsulates the packet with tunnel headers that direct the packet to the remote MSFE (e.g., by using a particular tunnel protocol that is used and recognized by the remote tunnel endpoint implemented by MSFE). As shown in this stage, the tunneling module 1040 of MHFE has attached a new header, which indicates the network layer address for the destination VTEP (i.e., SW-VTEP shown on the packet) of the MSFE 1030. The encapsulated packet in this stage, is forwarded through the physical network infrastructure to the destination MSFE using the tunnel header data.

The third stage 1015 shows that the tunneling module 1040 of the destination MSFE has received the packet, removed the tunnel header from the encapsulated packet, and sent the decapsulated packet to the forwarder module 1050 of the MSFE. The forwarder module in turn performs the forwarding processing for the logical port of the logical switch to which the end machine APP-VM1 is coupled. During this forwarding processing, the destination forwarder module may or may not check the packet against the ACL table of the MSFE 1030. The forwarder module of the destination MSFE then sends the packet to the destination end machine APP-VM based on the destination MAC address of the packet that is identified during the forwarding processing of the forwarding modules.

Returning to FIG. 9, when the process determines (at 940) that the packet cannot be forwarded towards its destination (e.g., based on the matched ACL rule of the ACL table) the process drops (or denies) the packet. The process then determines (at 960) whether there are more packets to process (e.g., the data flow has more packets to process). When the process determines that there is no more packet to process the process ends. On the other hand, if the process determines that there is at least one more packet to process, the process receives (at 970) the next packet and returns to operation 920 to start performing forwarding processing for the last received packet.

The specific operations of the process 900 may not be performed in the exact order shown and described. The specific operations may not be performed in one continuous series of operations, and different specific operations may be performed in different embodiments. Additionally, one of ordinary skill in the art would realize that the process 900 could be implemented using several sub-processes, or as part of a larger macro process.

Figure 11:
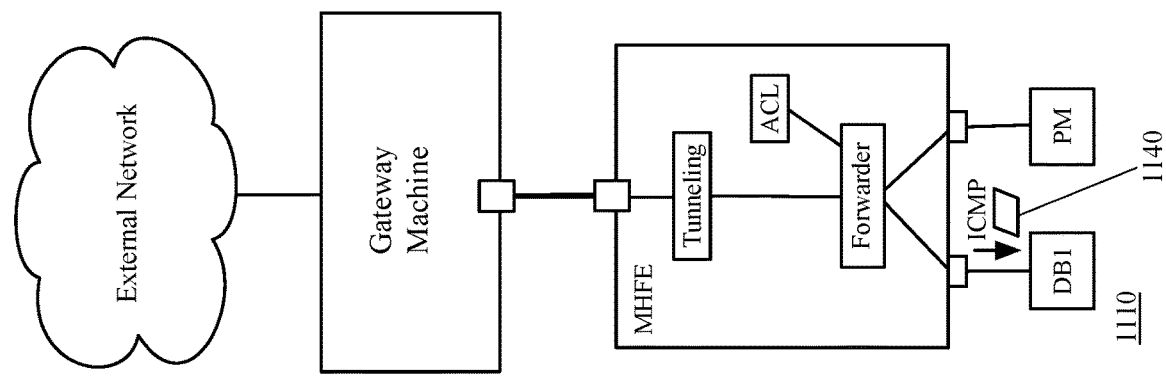
FIG. 11 illustrates another example of processing a packet, sent by a physical machine, at an MHFE and applying network security policy on the packet at the logical forwarding ports that process the packet.
Figure 11:
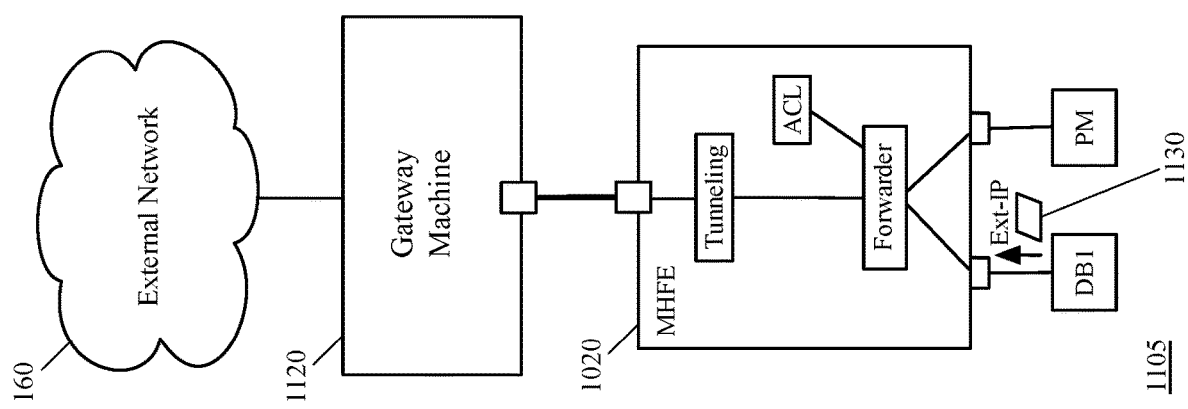

FIG. 11 illustrates another example of processing a packet, sent by a physical machine, at an MHFE and applying network security policy on the packet at the logical forwarding ports that process the packet. Specifically, this figure shows, through two different stages 1105-1110, a packet being forwarded from a physical database server connected to an MHFE to an external network 160. The figure includes the same MHFE 1020 shown in FIG. 10 with the same modules shown in this figure and a gateway machine 1120 that is at the edge of network and connected to the external network 160.

The first stage 1105 shows that the machine DB1 sends a packet 1130 to an end machine in the external network 160 through a physical port of the MHFE 1020. However, the logical network policy forbids any communication initiated by the database servers with the external network. The forwarder module of the MHFE performs the forwarding processing for the logical port to which the machine DB1 is connected (in the same manner described above by reference to FIG. 10), and based on the matched ACL rule realizes that the packet should be denied from further forwarding.

The matched ACL rule could be an ACL rule that is defined for the logical switch to which the machine is connected, or one step further, for the logical port that connects the logical switch to the external network. That is, the forwarder module may find no match in the ACL table during the forwarding processing for the logical port of the logical switch. However, when the packet is forwarded to the next logical forwarding element pipeline (i.e., the pipeline of the logical router), the forwarder module matches the packet against the ACL table based on an identified port of a routing component of the logical router, and based on a matched rule, denies the packet from further forwarding.

The second stage 1110 shows that the forwarder module, instead of continuing on performing forwarding processing on the packet and sending the packet to the tunneling module, sends an Internet Control Message Protocol (ICMP) error message back to the end machine DB1. In some other embodiments, the forwarder module sends other type of messages back to the originator of the packet, or simply drops the packet.

II. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
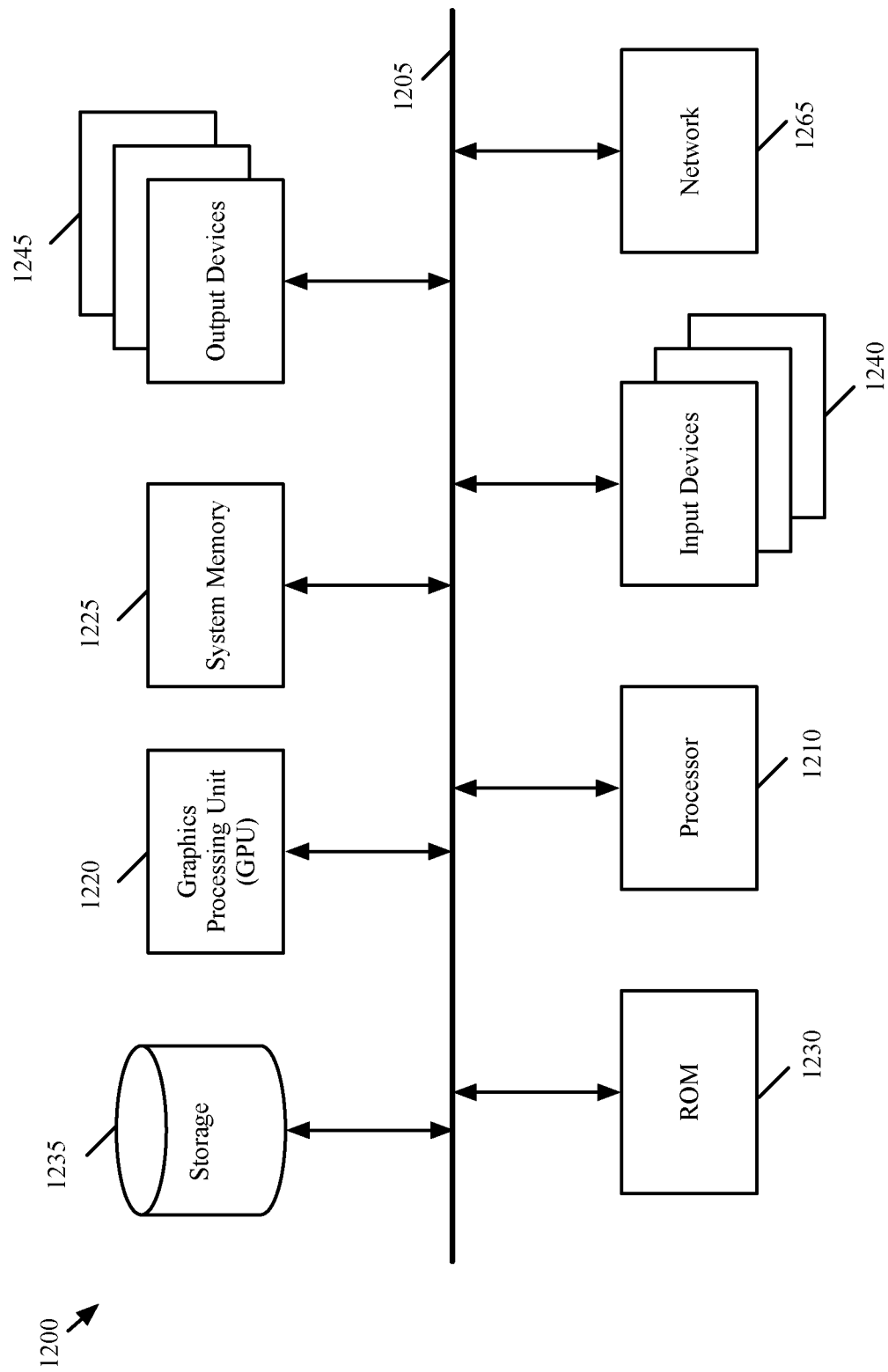
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash memory device, etc., and its corresponding drive) as the permanent storage device. Like the permanent storage device 1235, the system memory 1225 is a read-and-write memory device. However, unlike storage device 1235, the system memory 1225 is a volatile read-and-write memory, such a random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 4 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for configuring a managed hardware forwarding element (MHFE) to implement a security policy associated with a logical switch of a logical network, the method comprising:
receiving a security policy comprising at least one security rule for a physical machine connected to a physical port of the MHFE; and
populating (i) a physical port table stored on the MHFE with physical port data that maps the physical port of the MHFE to the logical switch of the logical network, (ii) an access control list (ACL) table stored on the MHFE with ACL rules data generated based on the at least one security rule, and (iii) a linking table stored on the MHFE with linking data that links the ACL rules data in the ACL table to the physical port data in the physical port table,
wherein the MHFE uses the physical port table, access control list table, and linking table to apply the at least one security rule to logical network traffic processed by the MHFE.

2. The method of claim 1, wherein a particular security rule comprises a field that specifies that the rule is applied for the logical switch to which the physical machine is logically connected.

3. The method of claim 2, wherein the logical switch comprises a logical port to which the physical machine is logically connected and the logical port maps to the physical port of the MHFE.

4. The method of claim 1, wherein a set of the security rules comprise firewall rules that are applied to logical network traffic in a distributed manner by a logical firewall that comprises a plurality of firewall instances instantiated on a plurality of host computers on which data compute nodes attached to the logical network execute.

5. The method of claim 1, wherein a particular security rule comprises a security group as one of a source address and a destination address, the security group comprising a plurality of data compute nodes attached to the logical network that share a common property.

6. The method of claim 1, wherein populating the physical port table, ACL table, and linking table comprises distributing the physical port data, ACL rules data, and linking data to the MHFE using an open source protocol that is recognizable and used by the MHFE.

7. The method of claim 1, wherein the MHFE determines security rules to apply to a logical network packet received from the physical machine by (i) mapping the physical port at which the packet is received to the logical switch and to an entry of the linking table using the physical port table and (ii) using the linking table entry to identify a set of one or more ACL table entries storing rules data for rules to apply to the packet.

8. The method of claim 7, wherein the MHFE applies the security rules to the packet by using the rules data stored in the identified set of ACL table entries.

9. The method of claim 1, wherein a particular entry in the ACL rules table specifies at least one of a source layer 2 address and a destination layer 2 address for packets to which the particular entry applies.

10. The method of claim 1, wherein each entry in the ACL rules table specifies (i) a set of conditions of packets to which the entry applies and (ii) an action for the MHFE to take on packets to which the entry applies.

11. A non-transitory machine-readable medium storing a program which when executed by at least one processing unit configures a managed hardware forwarding element (MHFE) to implement a security policy associated with a logical switch of a logical network, the program comprising sets of instructions for:
receiving a security policy comprising at least one security rule for a physical machine connected to a physical port of the MHFE; and
populating (i) a physical port table stored on the MHFE with physical port data that maps the physical port of the MHFE to the logical switch of the logical network, (ii) an access control list (ACL) table stored on the MHFE with ACL rules data generated based on the at least one security rule, and (iii) a linking table stored on the MHFE with linking data that links the ACL rules data in the ACL table to the physical port data in the physical port table,
wherein the MHFE uses the physical port table, access control list table, and linking table to apply the at least one security rule to logical network traffic processed by the MHFE.

12. The non-transitory machine-readable medium of claim 11, wherein a particular security rule comprises a field that specifies that the rule is applied for the logical switch to which the physical machine is logically connected.

13. The non-transitory machine-readable medium of claim 12, wherein the logical switch comprises a logical port to which the physical machine is logically connected and the logical port maps to the physical port of the MHFE.

14. The non-transitory machine-readable medium of claim 11, wherein a set of the security rules comprise firewall rules that are applied to logical network traffic in a distributed manner by a logical firewall that comprises a plurality of firewall instances instantiated on a plurality of host computers on which data compute nodes attached to the logical network execute.

15. The non-transitory machine-readable medium of claim 11, wherein a particular security rule comprises a security group as one of a source address and a destination address, the security group comprising a plurality of data compute nodes attached to the logical network that share a common property.

16. The non-transitory machine-readable medium of claim 11, wherein the set of instructions for populating the physical port table, ACL table, and linking table comprises a set of instructions for distributing the physical port data, ACL rules data, and linking data to the MHFE using an open source protocol that is recognizable and used by the MHFE.

17. The non-transitory machine-readable medium of claim 11, wherein the MHFE determines security rules to apply to a logical network packet received from the physical machine by (i) mapping the physical port at which the packet is received to the logical switch and to an entry of the linking table using the physical port table and (ii) using the linking table entry to identify a set of one or more ACL table entries storing rules data for rules to apply to the packet.

18. The non-transitory machine-readable medium of claim 17, wherein the MHFE applies the security rules to the packet by using the rules data stored in the identified set of ACL table entries.

19. The non-transitory machine-readable medium of claim 11, wherein a particular entry in the ACL rules table specifies at least one of a source layer 2 address and a destination layer 2 address for packets to which the particular entry applies.

20. The non-transitory machine-readable medium of claim 11, wherein each entry in the ACL rules table specifies (i) a set of conditions of packets to which the entry applies and (ii) an action for the MHFE to take on packets to which the entry applies.

* * * * *